US007636407B2

(12) United States Patent
Maeda et al.

(10) Patent No.: US 7,636,407 B2
(45) Date of Patent: Dec. 22, 2009

(54) SIGNAL DETECTOR USED IN WIRELESS COMMUNICATION SYSTEM

(75) Inventors: Koji Maeda, Yokosuka (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 616 days.

(21) Appl. No.: 11/239,199

(22) Filed: Sep. 30, 2005

(65) Prior Publication Data
US 2006/0067446 A1      Mar. 30, 2006

(30) Foreign Application Priority Data

| Sep. 30, 2004 | (JP) | ............................. 2004-287234 |
| Sep. 2, 2005 | (JP) | ............................. 2005-255083 |

(51) Int. Cl.
*H04B 1/10* (2006.01)
(52) U.S. Cl. ....................... 375/349; 375/260; 375/346; 375/316; 375/285; 327/310; 327/311; 455/296; 455/303; 455/306; 455/307
(58) Field of Classification Search ................. 375/260, 375/346, 350
See application file for complete search history.

(56) References Cited

U.S. PATENT DOCUMENTS

| 5,287,576 | A | * | 2/1994 | Fraser | ............................. | 5/637 |
| 5,828,660 | A | * | 10/1998 | Baum et al. | .................. | 370/330 |
| 6,011,597 | A | * | 1/2000 | Kubo | .......................... | 348/725 |
| 6,018,282 | A | * | 1/2000 | Tsuda | ......................... | 333/205 |
| 6,289,064 | B1 | * | 9/2001 | Hiramatsu et al. | .......... | 375/365 |
| 6,546,057 | B1 | * | 4/2003 | Yeap | ........................... | 375/285 |

(Continued)

FOREIGN PATENT DOCUMENTS

DE          101 52 628 A1      5/2003

(Continued)

OTHER PUBLICATIONS

Koji Maeda, et al., "Interference Canceller for Signals with Different Symbol Rates", Proc. IEICE General Conference, B-5-174, Mar. 2004, 1 page (with partial English translation).

(Continued)

*Primary Examiner*—Shuwang Liu
*Assistant Examiner*—Gina McKie
(74) *Attorney, Agent, or Firm*—Oblon, Spivak, McClelland, Maier & Neustadt, L.L.P.

(57) ABSTRACT

A signal detector arranged in a receiver of a wireless communication device includes a variable passband bandpass filter configured to bandlimit a received signal using a variable passband; a signal parameter detection unit configured to detect a signal parameter of each of a plurality of signals contained in the received signal; a detection order determination unit configured to determine a detection order for detecting the signals from the received signal based on the signal parameter; a parameter control unit configured to control the passband of the variable passband bandpass filter based on the detection order and the signal parameter; and an equalization and decision unit configured to equalize and decide the bandlimited signal output from the variable passband bandpass filter. The signals contained in the received signal are successively detected from the received signal according to the detection order by means of the variable passband bandpass filter and the equalization and decision unit.

15 Claims, 34 Drawing Sheets

U.S. PATENT DOCUMENTS

| | | | |
|---|---|---|---|
| 2003/0026028 A1* | 2/2003 | Ichihara et al. | 360/65 |
| 2003/0031234 A1* | 2/2003 | Smee et al. | 375/147 |
| 2003/0216122 A1 | 11/2003 | Cordone et al. | |
| 2004/0141565 A1 | 7/2004 | Kwak et al. | |
| 2004/0213366 A1* | 10/2004 | Ono | 375/348 |
| 2005/0003827 A1* | 1/2005 | Whelan | 455/454 |
| 2006/0015277 A1* | 1/2006 | Bernard et al. | 702/76 |
| 2006/0093071 A1* | 5/2006 | Prasad et al. | 375/329 |

FOREIGN PATENT DOCUMENTS

| | | |
|---|---|---|
| EP | 1 069 722 A2 | 1/2001 |

OTHER PUBLICATIONS

Babak Hassibi, "An Efficient Square-Root Algorithm for Blast", International Conference on Acoustics, Speech and Signal Processing (ICASSP), Jun. 2000, pp. 737-740.

Gottfried Ungerboeck, "Fractional Tap-Spacing Equalizer and Consequences for Clock Recovery in Data Modems", IEEE Transaction on Communications, vol. COM-24, No. 8, Aug. 1976, pp. 856-864.

Koji Maeda, et al., "Successive Multi-user Detector for Signals having Different Signal Bandwidths", Proc. IEICE General Conference, B-5-119, Mar. 2005, 1 page (with partial English translation).

* cited by examiner

FIG.14

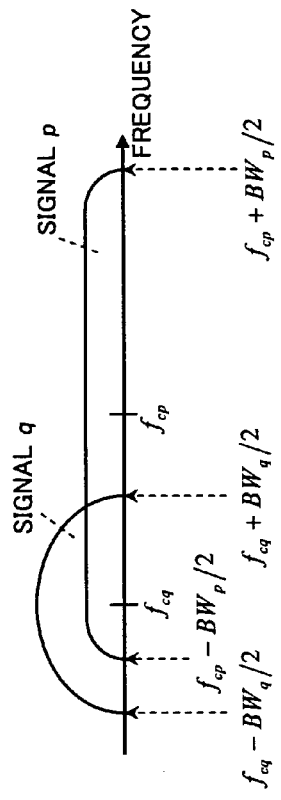

(a) CASE IN WHICH FREQUENCY BAND USED BY SIGNAL p ENCOMPASSES THAT USED BY SIGNAL q $$B_{overlay}(p,q) = BW_q$$

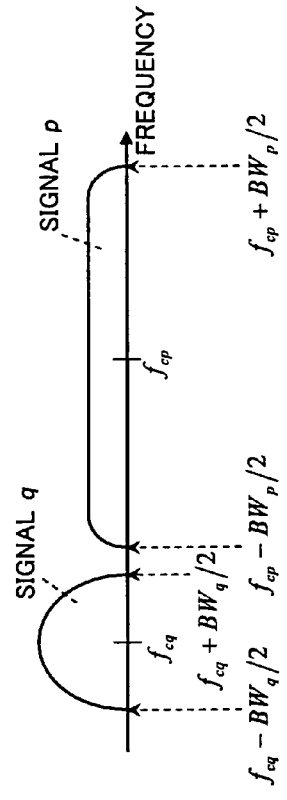

(c) CASE IN WHICH UPPER BOUND OF FREQUENCY BAND USED BY SIGNAL p RESIDES IN FREQUENCY BAND USED BY SIGNAL q $$B_{overlay}(p,q) = (f_{cq} + BW_q/2) - (f_{cp} - BW_p/2)$$

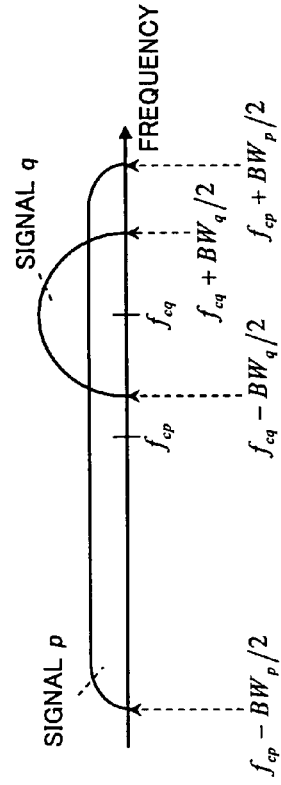

(b) CASE IN WHICH LOWER BOUND OF FREQUENCY BAND USED BY SIGNAL p RESIDES IN FREQUENCY BAND USED BY SIGNAL q $$B_{overlay}(p,q) = (f_{cp} + BW_p/2) - (f_{cq} - BW_q/2)$$

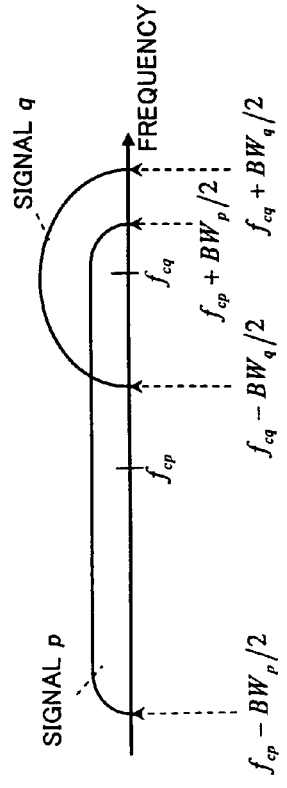

(d) CASE IN WHICH FREQUENCY BANDS USED BY SIGNAL p AND SIGNAL q DO NOT OVERLAP EACH OTHER $$B_{overlay}(p,q) = 0$$

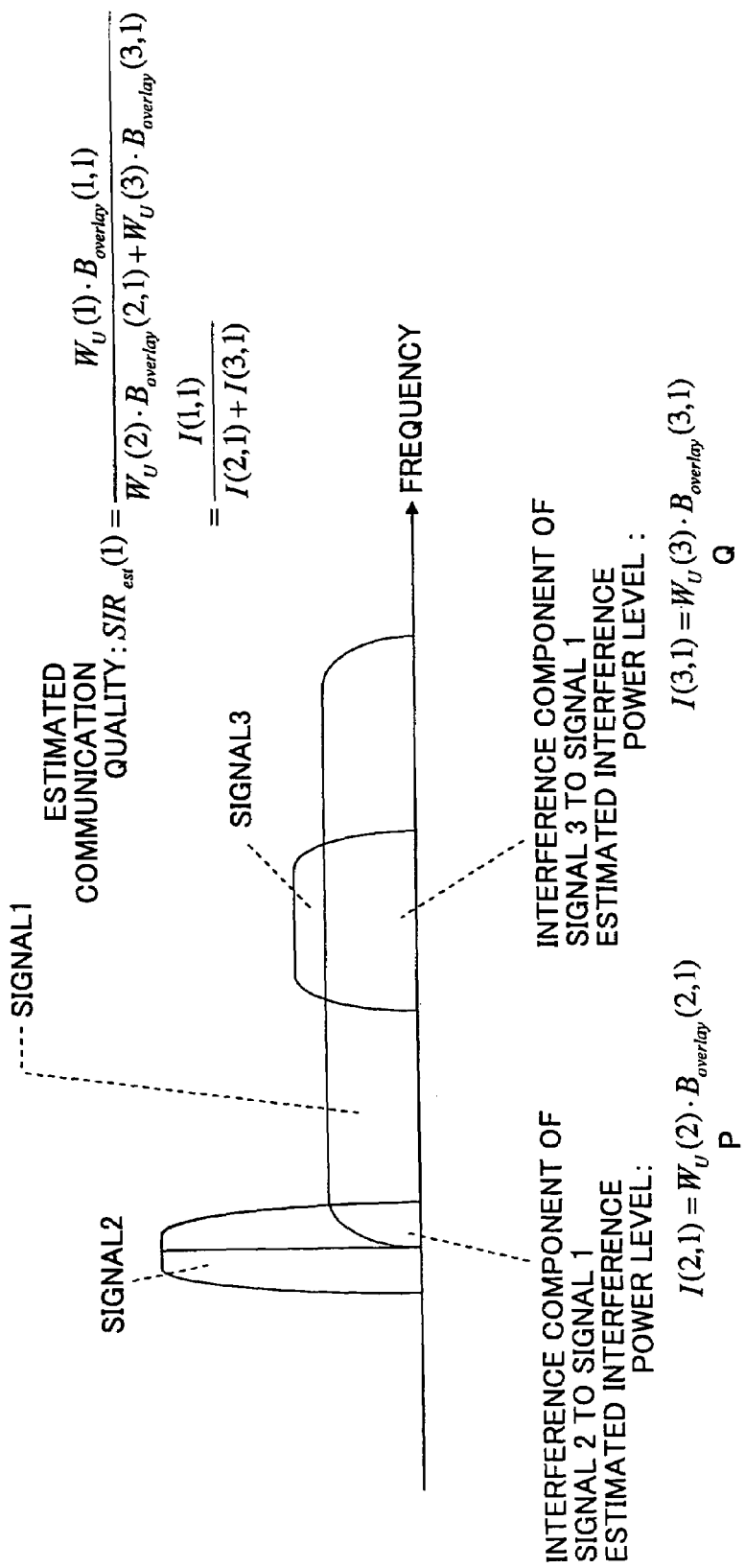

SIGNAL DETECTOR USED IN WIRELESS COMMUNICATION SYSTEM

FIELD OF THE INVENTION

The present invention relates to a signal detector used in a radio receiver in a wireless communication system.

BACKGROUND OF THE INVENTION

It is important for wireless communication systems to suppress interference in received signals in order to make efficient use of limited spectrum resources. One example of the technique for improving the efficiency in spectrum use is an interference canceller based on maximum likelihood sequence estimation (MLSE) shown in FIG. 1. This interference canceller, named a MLSE-based interference canceller, generates a replica of the received signal to substantially remove interference. See, for example, "Interference Canceller for Signals with Different Symbol Rates", Proc. IEICE General Conference, B-5-174, March, 2004, which publication is referred to as "Publication 1".

With the MLSE-based interference canceller shown in FIG. 1, a channel estimator "a" successively estimates the states of channels of a desired and an interference signals using an estimation error and a reference signal. A desired signal replica generator "b" and an interference signal replica generator "c" generate the replicas of the desired and the interference signals, respectively, for all possible symbol sequence candidates of the desired and the interference signals by performing convolution of the symbol sequence candidates with the associated channel estimation values. The desired signal replica and the associated interference signal replica are added to produce a received signal replica. A maximum likelihood sequence estimator "d" selects a pair of symbol sequence candidates of the desired and the interference signals, whose received signal replica is closest to the actual received signal, and outputs the selected symbol sequence candidate of the desired signal as a decision result of the received signal. In this manner, the interference is substantially eliminated. A known symbol sequence is used as the reference signal in the training section, and the decided symbol sequence is used as the reference signal in the data section.

By adaptively removing the interference signal from the received signal, different signals can use the same frequency at the same time, and consequently, frequency utilization efficiency can be improved.

Another known technique for improving the frequency utilization efficiency is successive multi-user detection shown in FIG. 2. In FIG. 2, multi-user detection is performed using a minimum mean square error (MMSE) filtering technique with respect to multiple user signals with the same signal bandwidth. See "An Efficient Square-root Algorithm for BLAST", International Conference on Acoustics, Speech and Signal Processing (ICASSP), June, 2000, which publication is referred to as "Publication 2".

In FIG. 2, multi-user detection is performed using MMSE filters to detect multiple user signals with the same bandwidth. The process is focused on the first detection target signal (the signal to be detected k-th is referred to as the "k-th detection target signal"). The first detection target signal is equalized using the MMSE filter #1 making use of channel state information of all the detection target signals estimated and held in advance. Based on the equalized signal, signal detection and replica generation for the first detection target signal are performed. Then, the process is focused on the second detection target signal to perform equalization, signal detection and replica generation, using a residual signal obtained by subtracting the replica of the first detection target signal from the input signal. Accordingly, interference from the first detection target signal has been reduced when carrying out signal detection of the second detection target signal, and a reliable detection result can be obtained. The k-th detection target signal is processed using a residual signal obtained by subtracting the replicas of the first through (k−1)th detection target signals from the input signal.

By successive detection and removal of the replicas of other signals that are interference sources to the target signal, various-types of signals can use the same frequency at the same time, whereby the frequency utilization efficiency is improved.

The MLSE-based interference canceller shown in FIG. 1 is capable of signal detection through generation of replicas of the signal components contained in the received signal. However, if the number of signals to be processed is increased, the complexity increases exponentially, and it becomes difficult to complete the process within a realistic processing time. Especially, when many narrow-band signals are overlaid on a broadband signal and transmitted together at the same frequency band, the multiple narrow-band signals have to be processed at the same time in order to detect the broadband signal, which makes the process more difficult.

With the MMSE filtering based multi-user detection shown in FIG. 2, signal equalization is performed at the MMSE filter using channel state information of not only the desired signal but also the interference signal, and therefore, the signal detection accuracy and the precision of replica generation can be maintained high. In general, the used channel state information is estimated on the receiving side. However, when multiple signals with different signal bandwidths are overlaid at the same frequency band, each signal is bandlimited by a filter (not shown) with a passband different from the transmission side, and therefore, the sampled signal is affected by the influence of inter-symbol interference (ISI). The inter-symbol interference for a detection target signal may not occur when using a conventional bandlimiting filter in an environment without delay waves because the pass-bands of the transmission-side bandlimiting filter and the receiving-side bandlimiting filter are the same for the detection target signal itself contained in the received signal. However, for the other user signals with signal bandwidths different from that of the detection target signal, the received signal is bandlimited by the receiving-side bandlimiting filter for the detection target signal, and therefore, the pass-bands of the transmission-side bandlimiting filter and the receiving-side bandlimiting filter are different from each other. In this state, inter-symbol interference occurs. The inter-symbol interference varies greatly depending on the sampling timing, and then the channel state information, which includes the effects of bandlimiting filter, also fluctuates greatly depending on the sampling timing. Such fluctuations may be estimated by channel estimation using a fractional tap-spacing coefficient variable filter. See "Fractional Tap-Spacing Equalizer and Consequences for Clock Recovery in Data Modems," IEEE Transaction on Communications, August, 1976, which publication is referred to as "Publication 3". However, with this method, the number of filter taps is relatively large, and consequently, computational workload increases and degradation in channel estimation accuracy becomes conspicuous.

SUMMARY OF THE INVENTION

The present invention was conceived to overcome the above-described problems in the prior art, and embodiments of the invention provide a signal detector that is capable of signal detection with low complexity under the condition of existence of multiple signals overlaid at the same frequency band, and of improving the frequency utilization efficiency.

In one aspect of the invention, a signal detector is provided, which signal detector is arranged in a receiver of a wireless communication device used in a wireless communication environment in which multiple wireless communication devices communicate with each other using different signal bandwidths and different carrier frequencies. The signal detector includes:
(a) a variable passband bandpass filter configured to suppress the out-of-band signals in a received signal using a variable passband;
(b) a signal parameter detection unit configured to detect a signal parameter of each of a plurality of signals contained in the received signal;
(c) a detection order determination unit configured to determine a detection order for detecting the signals from the received signal based on the signal parameter;
(d) a parameter control unit configured to control the passband of the variable passband bandpass filter based on the detection order and the signal parameter; and
(e) an equalization and decision unit configured to equalize and decide on the bandlimited signal from the variable passband bandpass filter, the signals contained in the received signal being successively detected from the received signal according to the detection order by means of the variable passband bandpass filter and the equalization and decision unit.

With this arrangement, multiple user signals can be detected from the received signal with low complexity under the wireless communication environment different types of signals share a same frequency band.

In another aspect of the invention, a receiver of a wireless communication device used in a wireless communication environment in which multiple wireless communication devices communicate with each other using various signal bandwidths is provided. The receiver comprising a multi-user detector that includes:
(a) a plurality of bandlimiting filters with different pass-bands provided for multiple signals, which have various signal bandwidths and carrier frequencies, contained in an input signal;
(b) a channel estimator configured to estimate a channel state of each of the signals using signal information taking into account inter-symbol interference caused by transmission-end filters and receiving-end filters of the receiver;
(c) a minimum mean square error (MMSE) filter configured to calculate a filter coefficient using the estimated channel state information and the signal information and to equalize the associated bandlimited signal;
(d) a soft-in soft-out decoder configured to decide on each of user data items contained in the signals on the basis of the signal information and to calculate a likelihood values of each of symbols mapped to a signal space;
(e) a replica generator configured to generate a symbol sequence replica based on the likelihood values and to produce a received signal replica using the symbol sequence replica and the signal information, the symbol sequence replica being supplied to the minimum mean square error filter and used for the equalization of the bandlimited signal; and
(f) a subtractor configured to subtract the received signal replica from the input signal.

With this arrangement, equalization can be performed taking into account large fluctuation in inter-symbol interference caused by filters with different pass-bands, and accurate signal detection can be achieved.

The receiver may have a multi-stage multi-user detection unit consisting of two or more said multi-user detectors. In this case, each of the multi-user detectors performs signal detection and replica generation using a replica signal produced by the previous multi-user detector.

This arrangement can improve the accuracy of replica generation, and more accurate signal detection can be realized.

BRIEF DESCRIPTION OF THE DRAWINGS

Features and advantages of the invention will become more apparent from the following detailed description when read in conjunction with the accompanying drawings, in which

FIG. 14 is a schematic diagram illustrating the relation between bandwidths used by the signals and overlapped frequency bandwidth;

FIG. 15 is a schematic diagram illustrating mutual interference between signals;

DETAILED DESCRIPTION OF THE PREFERRED EMBODIMENT

The present invention is described in detail below in conjunction with the attached drawings.

First Embodiment

Figure 1:
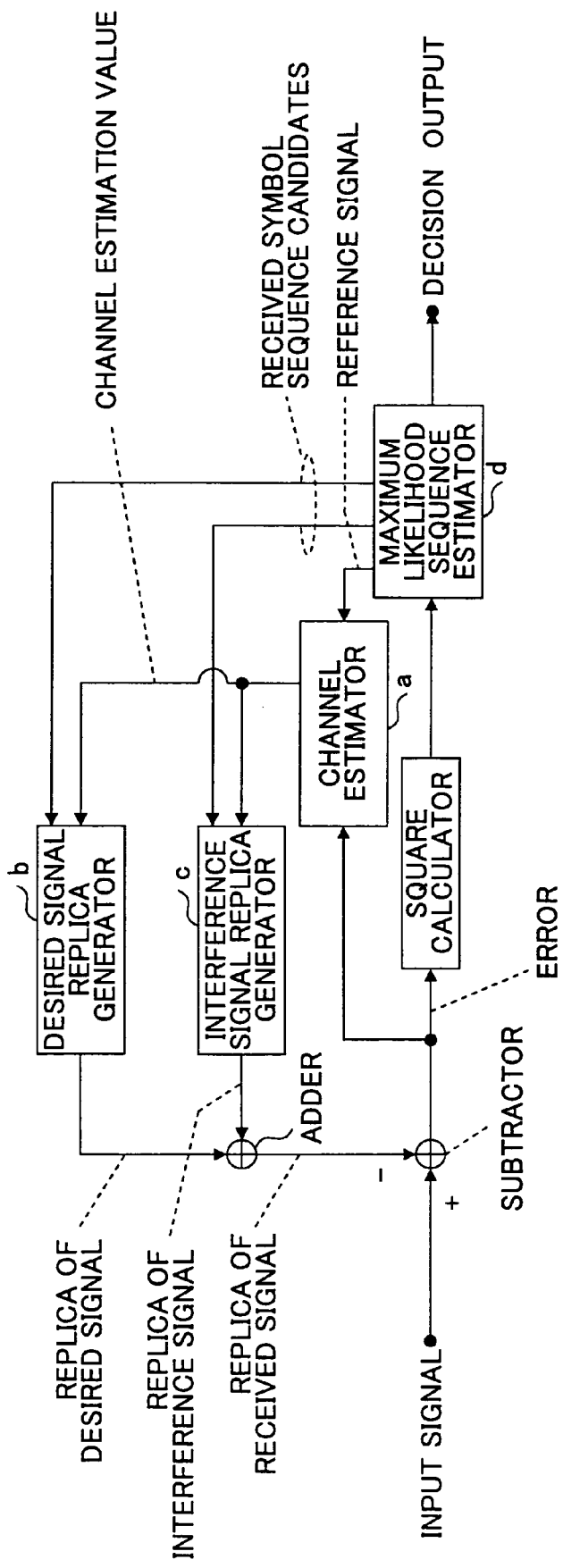
FIG. 1 is a block diagram illustrating a conventional MLSE-based interference canceller.
Figure 2:
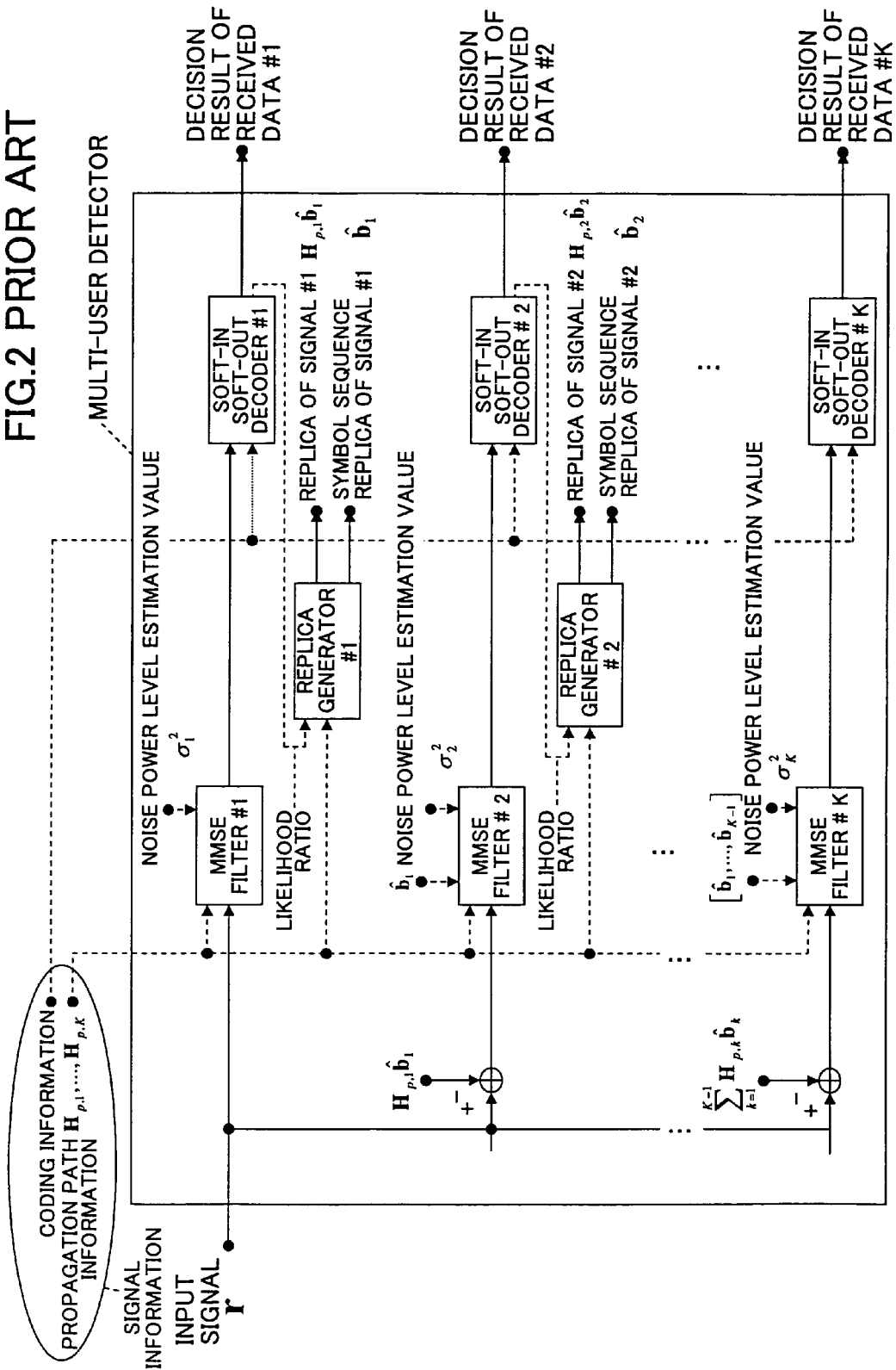
FIG. 2 is a block diagram illustrating a conventional successive multi-user detection unit based on an MMSE filter.
Figure 3:
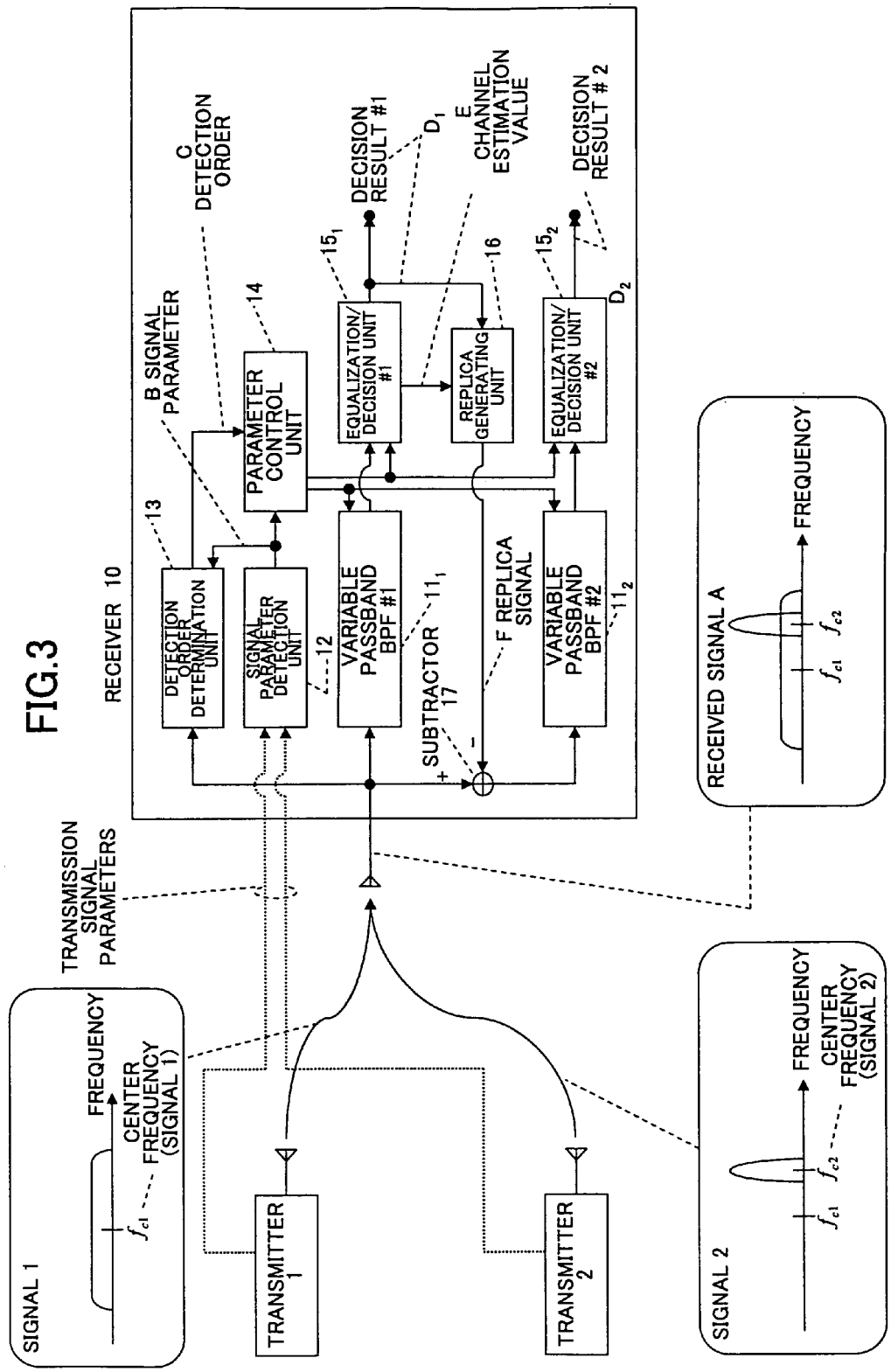
FIG. 3 is a block diagram illustrating a receiver with a signal detector according to the first embodiment of the invention.
Figure 4:
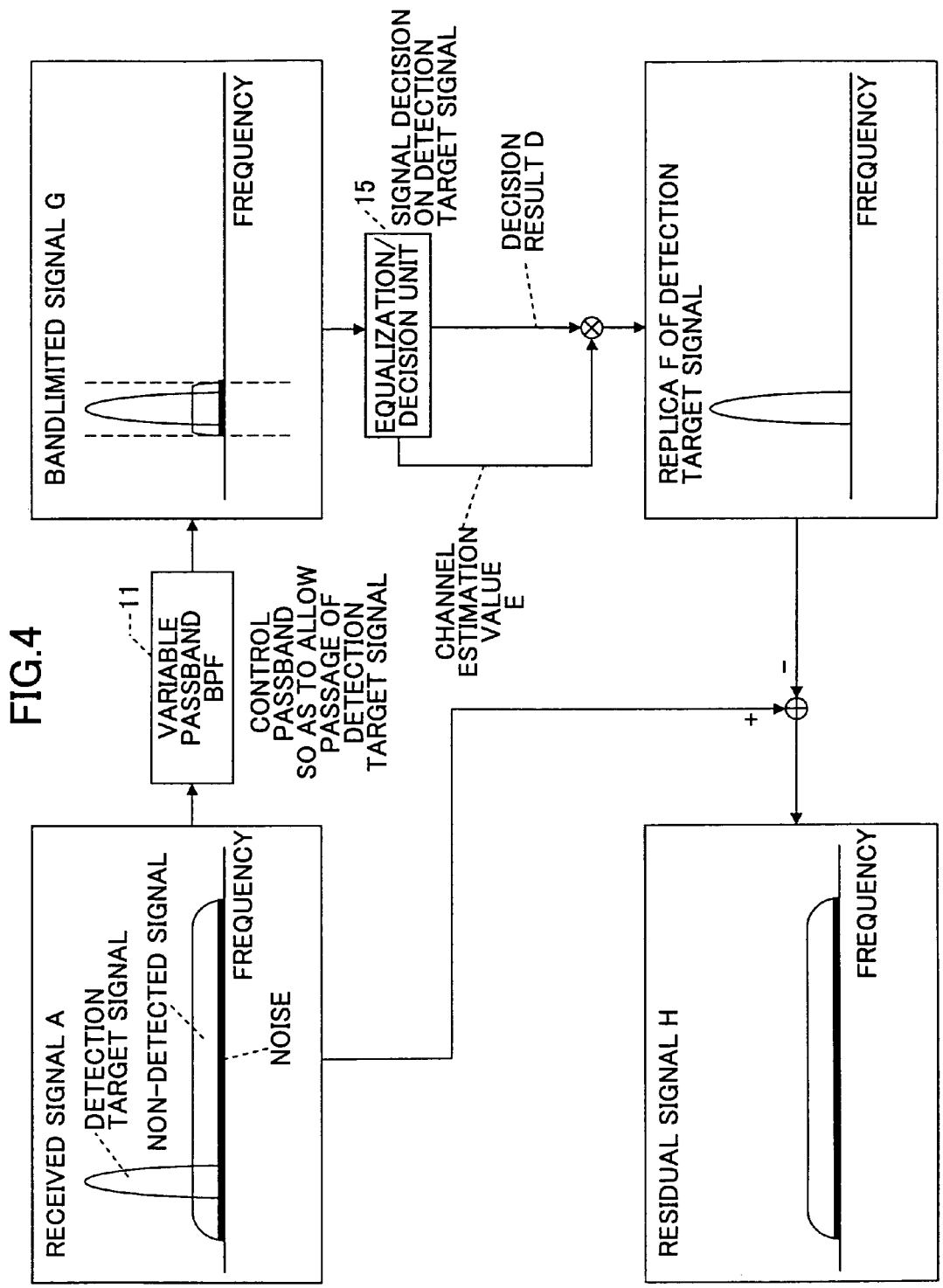
FIG. 4 is a schematic diagram illustrating the outline of the signal processing performed by the signal detector.

FIG. 3 is a block diagram illustrating a receiver with a signal detector according to the first embodiment of the invention, and FIG. 4 is a schematic diagram illustrating the outline of the signal processing performed by the signal detector.

The receiver 10 is used in a wireless communication device, and includes variable passband bandpass filters (BPF) 11 ($11_1$, $11_2$), a signal parameter detection unit 12, a detection order determination unit 13, a parameter control unit 14, equalization and decision units (which may be referred simply as equalization/decision unit) 15 ($15_1$, $15_2$), a replica generating unit 16, and a subtractor 17. The variable passband BPF 11 suppresses the out-of-band signal in the received signal with a variable passband. The signal parameter detection unit 12 detects signal parameters of multiple signals contained in the received signal. The detection order determination unit 13 determines a detection sequence (or detection order) for detecting each of the signals from the received signal based on the detected signal parameters and the received signal. The parameter control unit 14 controls the passband of each of the variable passband BPFs 11 based on the detection order and the signal parameters. The equalization/decision unit 15 equalizes the bandlimited signal output from the associated variable passband BPF 11 and performs signal decision. The replica generating unit 16 generates a replica of the received signal using the decision result and a channel estimation value estimated through the equalization supplied from the equalization/decision unit 15. The subtractor 17 subtracts the replica signal from the received signal.

In this example, transmitter 1 and transmitter 2 transmit signals with different transmission parameters, and the receiver 10 receives a signal A in which these transmission signals are combined. The received signal A is supplied to the first variable passband BPF $11_1$, as well as to the detection order determination unit 13 and the subtractor 17. The signal parameters of the transmission signals 1 and 2, including the signal bandwidths, the carrier frequencies (or center frequencies), and the modulation schemes, are informed to the signal parameter detection unit 12 in advance prior to the actual communication using, for example, a control signal through a common wireless channel.

The signal parameter detection unit 12 detects the signal parameters of signal 1 and signal 2 contained in the received signal, and supplies the detected parameters to the detection order determination unit 13 and the parameter control unit 14. The detection order determination unit 13 determines a detection sequence (or detection order) for detecting signal 1 and signal 2 from the received signal, based on the received signal A and the signal parameters B, and outputs a detection order C to the parameter control unit 14. The parameter control unit 14 controls the passband of the variable passband BPF #1 ($11_1$) so as to allow the signal with the highest detection order to pass, based on the information of the center frequency and the signal bandwidth detected by the signal parameter detection unit 12. The parameter control unit 14 also supplies the parameters required for equalization and signal decision, such as the modulation scheme and the symbol rate, of the first detected signal to the equalization/decision unit #1 ($15_1$). Similarly, the parameter control unit 14 controls the variable passband BPF #2 ($11_2$) and the equalization/decision unit #2 ($15_2$) using the signal parameters of the second detected signal.

The signal having passed through the variable passband BPF #1 ($11_1$) becomes the bandlimited signal G consisting of the signal components corresponding only to the frequency band of the first detected signal, as illustrated in FIG. 4, and other signal components are suppressed. The bandlimited signal G is input to the equalization/decision unit #1 ($15_1$), and subjected to equalization and decision processes. The decision result #1 ($D_1$) and the channel estimation value E determined by the equalization process are supplied to the replica generating unit 16. The replica generating unit 16 generates a replica signal F from the decision result #1 ($D_1$) and the channel estimation value E, and supplies the replica signal F to the subtractor 17. The subtractor subtracts the replica signal F from the received signal A, and supplies the residual signal to the second variable passband BPF #2 ($11_2$). The signal input to the second variable passband BPF #2 ($11_2$) is the residual signal H obtained by subtracting the replica of the |first detection target signal| from the received signal, as illustrated in FIG. 4. Signal H contains the second detection target signal to be detected next and noise. The second variable passband BPF #2 ($11_2$) changes the passband as to allow the signal with the second highest detection order designated by the parameter control unit 14 to pass. The band-limited signal is supplied to the associated equalization/decision unit #2 ($15_2$). The equalization/decision unit #2 ($15_2$) performs equalization and decision making on the second detected signal, and outputs the decision result #2 ($D_2$). In this manner, signal decision making of the second detection target signal is performed with little interference from the first detected signal on condition that the first detected signal is decided on correctly. Consequently, multiple user signals contained in the received signal A can be detected accurately.

Second Embodiment

Figure 5:
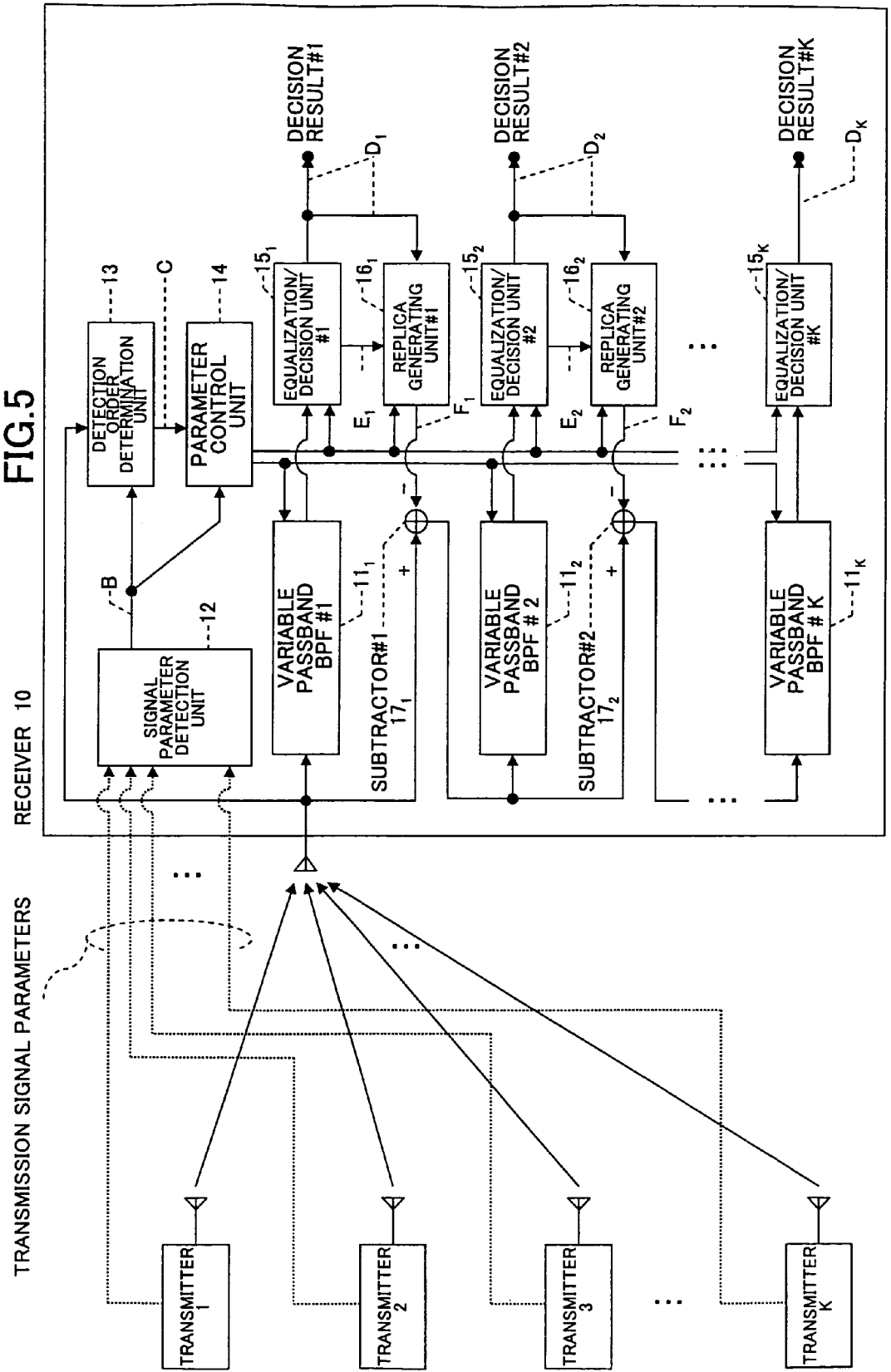
FIG. 5 is a block diagram illustrating a receiver with a signal detector according to the second embodiment of the invention.

FIG. 5 is a block diagram illustrating a receiver with a signal detector according to the second embodiment, in which the receiver 10 receives a signal in which k signals transmitted from k transmitters 1 through k are combined. The components functioning in the same way as those shown in FIG. 3 are labeled by the same symbols, and explanation for them is omitted.

The receiver 10 includes k variable passband BPFs 11 ($11_1$, $11_2$, ..., $11_k$), k equalization/decision units 15 ($15_1$, $15_2$, ..., $15_k$), k−1 replica generating units 16 ($16_1$, $16_2$, ..., $16_{k-1}$), and k−1 subtractors 17 ($17_1$, $17_2$, ..., $17_{k-1}$) The variable passband BPF #1 ($11_1$) changes the passband so as to pass the signal with the highest detection order. The variable passband BPF #2 ($11_2$) changes the passband so as to pass the signal with the second highest detection order. The k-th variable passband BPF #k ($11_k$) changes the passband so as to pass the k-th highest detection order. The signals having passed the variable passband BPFs #1 ($11_1$) through #k ($11_k$) are supplied to the associated equalization/decision units #1-#k, respectively. The equalization/decision units #1-#k perform equalization and signal decision making on the associated bandlimited signals, and output the decision results $D_1$, $D_2$, ..., $D_k$. The equalization/decision unit #1, #2, ..., supply the decision results $D_1$, $D_2$, ..., and the channel estimation results $E_1$, $E_2$, ..., determined through the equalization process to the replica generating units #1, #2, ..., respectively. The replica generating unit #1, #2, ..., generates replicas $F_1$, $F_2$, ..., of the signals of the associated detection orders, and supplies the replicas to the subtractors $17_1$, $17_2$, ... . The first subtractor #1 ($17_1$) subtracts replica $F_1$ of the signal to be detected first from the received signal A, and supplies the residual signal to the variable passband BPF #2 ($11_2$) and the second subtractor #2 ($17_2$). The second subtractor #2 ($17_2$) subtracts the replica $F_2$ of the signal to be detected second from the residual signal supplied from the subtractor #1, and supplies the residual signal to the next variable passband BPF #3 and subtractor #3. In this manner, the user signals are sequentially removed form the received signal beginning from the highest detection order toward the lower ones. In other words, a signal to be input to a certain variable passband BPF is a residual signal obtained by removing all the signals at the detection order higher than the currently focused signal from the received signal A. Consequently, accurate signal detection is realized.

Figure 6:
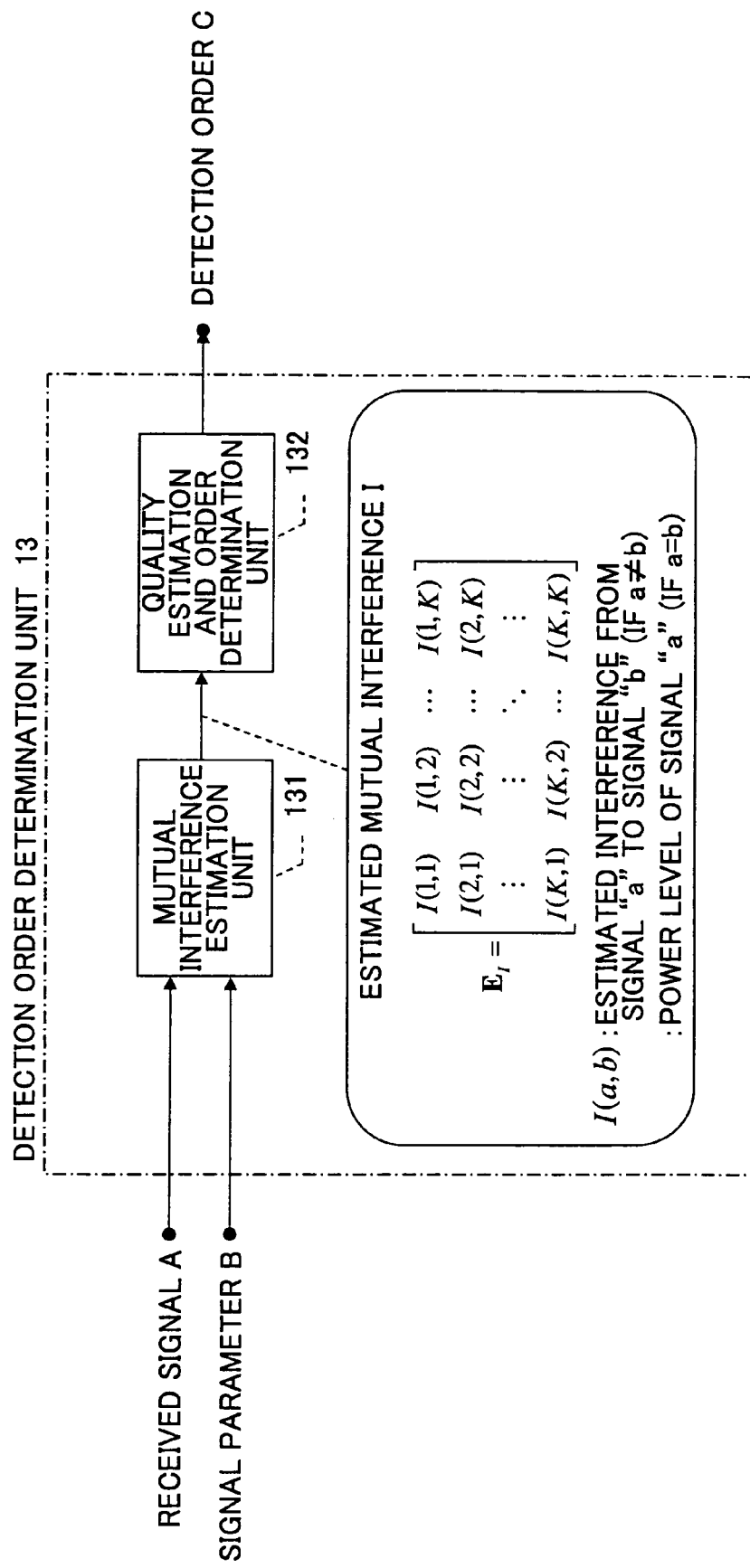
FIG. 6 is a block diagram illustrating an example of the detection order determination unit.

FIG. 6 is a block diagram of the detection order determination unit 13 according to the second embodiment. The detection order determination unit 13 includes a mutual interference estimation unit 131 and the quality estimation and order determination unit 132.

The mutual interference estimation unit 131 estimates mutual interference (I) between multiple signals contained in the received signal, based on the received signal A and the signal parameters B, and supplies the estimation result to the quality estimation/order determination unit 132. The estimated mutual interference I is expressed by $$E_I = \begin{bmatrix} I(1,1) & I(1,2) & \cdots & I(1,K) \\ I(2,1) & I(2,2) & \cdots & I(2,K) \\ \vdots & \vdots & \ddots & \vdots \\ I(K,1) & I(K,2) & \cdots & I(K,K) \end{bmatrix} \quad (1)$$

where element I(a, a) becomes the power level of signal "a".

Figure 7:
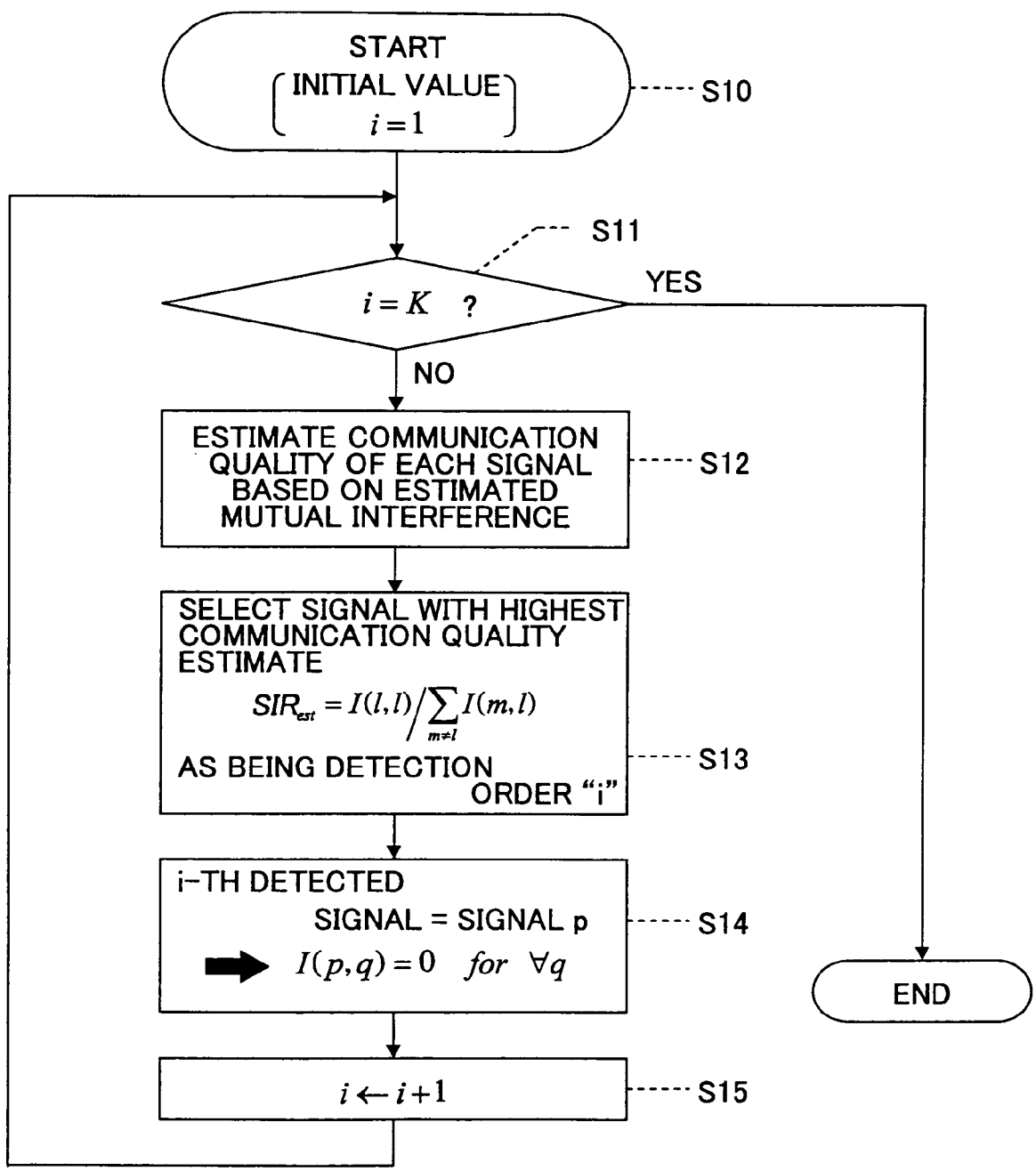
FIG. 7 is a flowchart showing the operation carried out by the quality estimation and order determination unit shown in FIG. 6.

FIG. 7 is a flowchart showing the operations carried out by the quality estimation/order determination unit 132. According to this operations flow, the quality estimation/order determination unit 132 determines the detection sequence (detection order) of the signals.

First, the initial value "1" is set in the detection order "i" (i=1) (step S10). Then, it is determined whether the value "i" is equal to the number (K) of signals contained in the received signal (step S11). If i≠K (NO in S11), the process proceeds to step S12, while if i=K (YES in S11) the process terminates. In step S12, the communication quality of each signal is estimated using the estimated mutual interference I. Then, the power ratio, SIRest, of the desired signal level to the interference level is calculated for each of the signals in the received signal using Equation (2), and the signal with the highest SIRest is selected as the i-th detected one (S13).

$$SIR_{est}(l) = \frac{I(l,l)}{\sum_{m \neq l} I(m,l)} \quad (2)$$

Then, the desired wave power level of the highest quality signal, which is selected in S13, itself and the interference power levels for the other signals caused by the highest quality signal are set to "0" (step S14). Although in this operation flow the power levels are set to zero, they may be set to a very small value taking into account the practical conditions of difficulties in completely removing the signals due to replica signal generation error. Then, the detection order "i" is incremented (i=i+1) (step S15), and the process returns to step S11.

By repeating the above-described process, the signal detection sequence is determined. The signals with better communication qualities and less influence of interference are detected preferentially.

Figure 8:
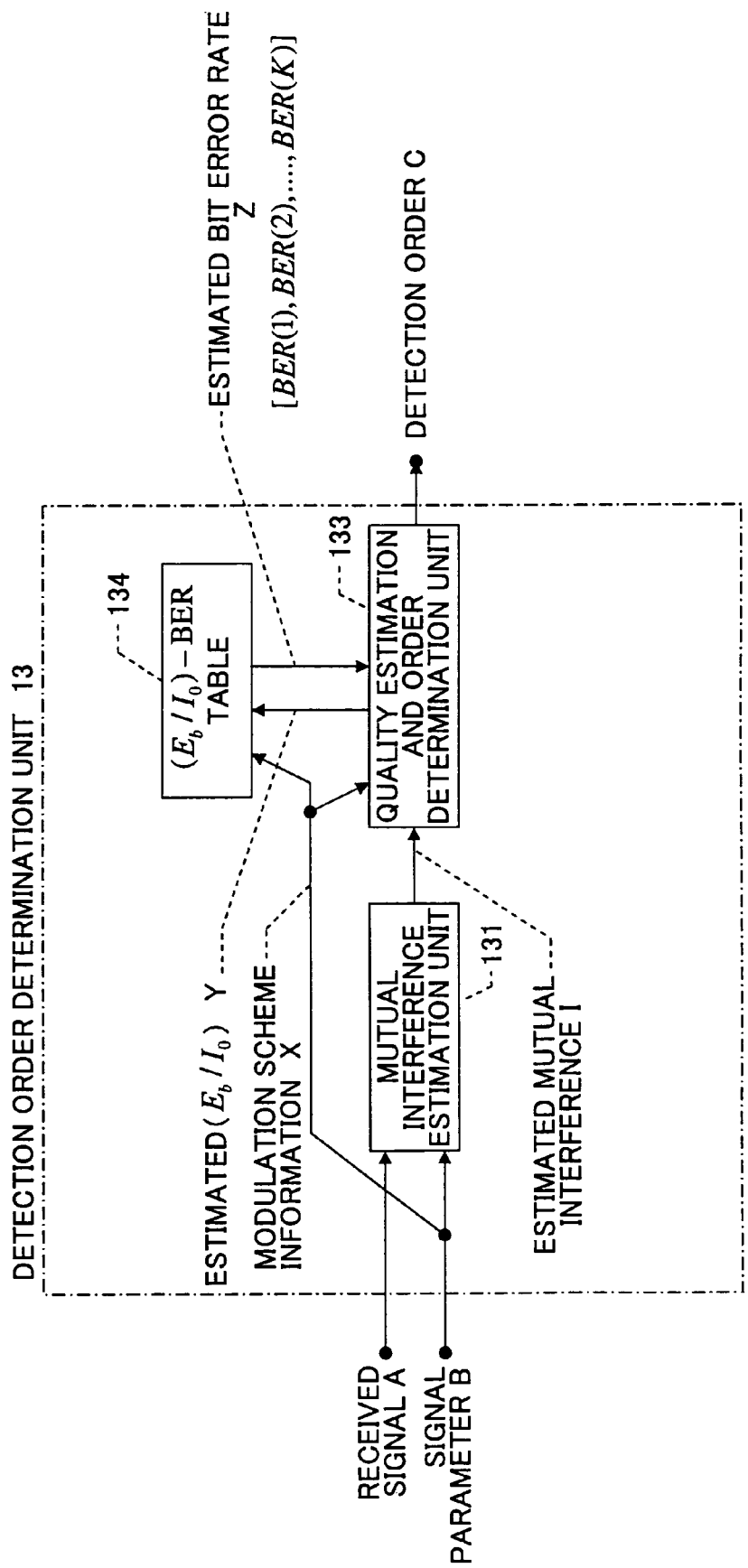
FIG. 8 is a block diagram illustrating another example of the detection order determination unit.

FIG. 8 is a block diagram illustrating another example of the detection order determination unit 13. In this example, the detection order determination unit 13 includes a mutual interference estimation unit 131, a quality estimation/order determination unit 133, and a table 134 recording the relation between signal power to interference power ratio per bit ($E_b/I_o$) and bit error rate (BER). The mutual interference estimation unit 131 estimates mutual interference I between multiple signals contained in the received signal, based on the received signal A and the signal parameters B, and supplies the estimation result to the quality estimation/order determination unit 133.

Figure 9:
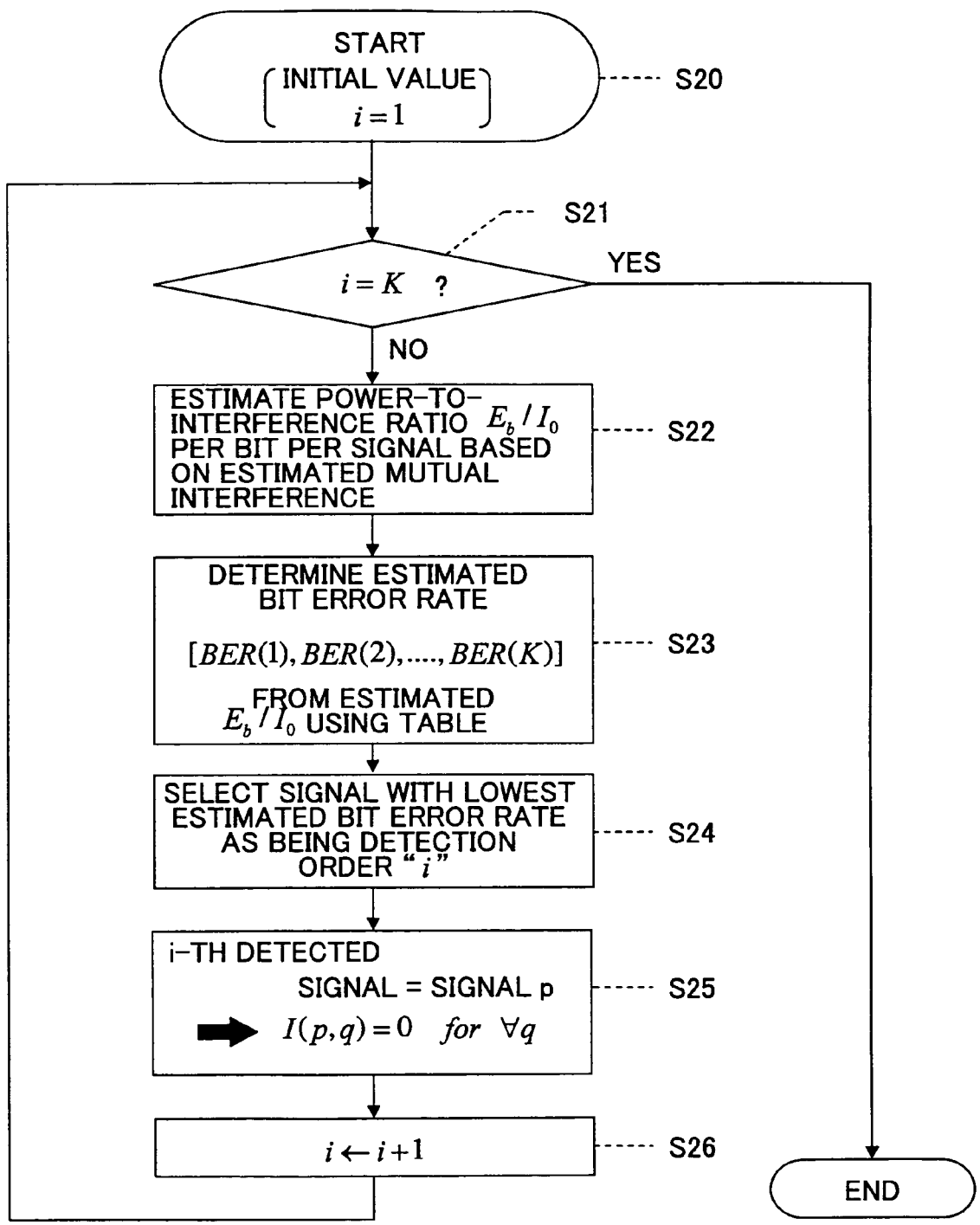
FIG. 9 is a flowchart showing the operation carried out by the quality estimation and order determination unit shown in FIG. 8.

FIG. 9 is a flowchart showing the operations carried out by the quality estimation/order determination unit 133. First, the initial value "1" is set as the detection order "i" (i=1) (step S20). Then, it is determined whether the value "i" is equal to the number (K) of signals contained in the received signal (step S21). If i≠K (NO in S21), the process proceeds to step S22, while if i=K (YES in S11) the process terminates. In step S22, signal power to interference power ratio per bit ($E_b/I_o$) is estimated based on the mutual interference I and the modulation scheme information X contained in the signal parameters B. Then, based on the estimated $E_b/I_0$, which estimate is labeled "Y", and the modulation scheme information X, the bit error rates [BER(1), BER(2), ..., BER(K)] of the respective signals in the received signal A are determined using the $(E_b/I_0)$-BER table 134 (S23). The symbol BER(p) is the estimated bit error rate of signal p. Then, the signal with the lowest bit error rate is selected as being at detection order "i" (step S24), Then, the interference levels that the selected signal affects the other signals and the desired wave power level of the selected signal (to be i-th detected) itself are set to "0" (step S25). Although in this operations flow the power levels are set to zero, they may be set to a very small value taking into account the practical conditions of difficulties in completely removing the signals due to replica signal generation error. Then, the detection order "i" is incremented (i=i+1) (step S26), and the process returns to step S21.

By repeating the above-described process, the signal detection sequence is determined. The signals with better communication qualities and less influence of interference are detected preferentially.

Figure 10:
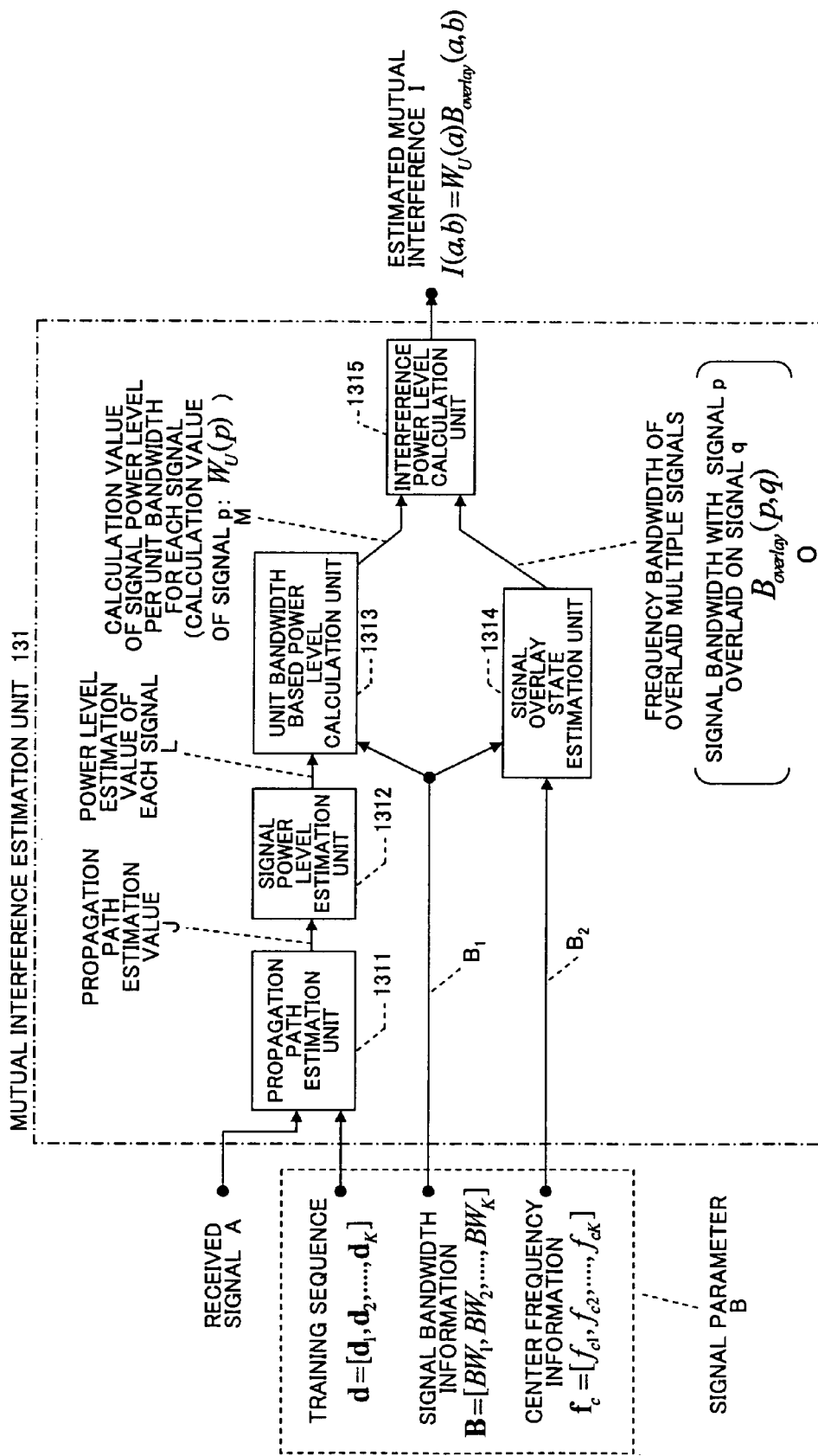
FIG. 10 is a block diagram illustrating an example of the mutual interference estimation unit.

FIG. 10 is a block diagram illustrating an example of the mutual interference estimation unit 131, which includes a propagation path estimation unit 1311, a signal power level estimation unit 1312, a unit-bandwidth-based power level calculation unit 1313, a signal overlay state estimation unit 1314, and an interference power level calculation unit 1315.

|The propagation path estimation| unit 1311 estimates the states of the propagation paths of the multiple signals contained in the received signal A, and supplies the estimated propagation path values J to the signal power level estimation unit 1312. In this example, training sequences of the signal parameters are input to the propagation path estimation unit 1311 to estimate the respective propagation paths; however, pilot symbols may be used to estimate the associated propagation paths. The signal power level estimation unit 1312 estimates the power levels of the respective signals from the estimated propagation path values J.

Figure 11:
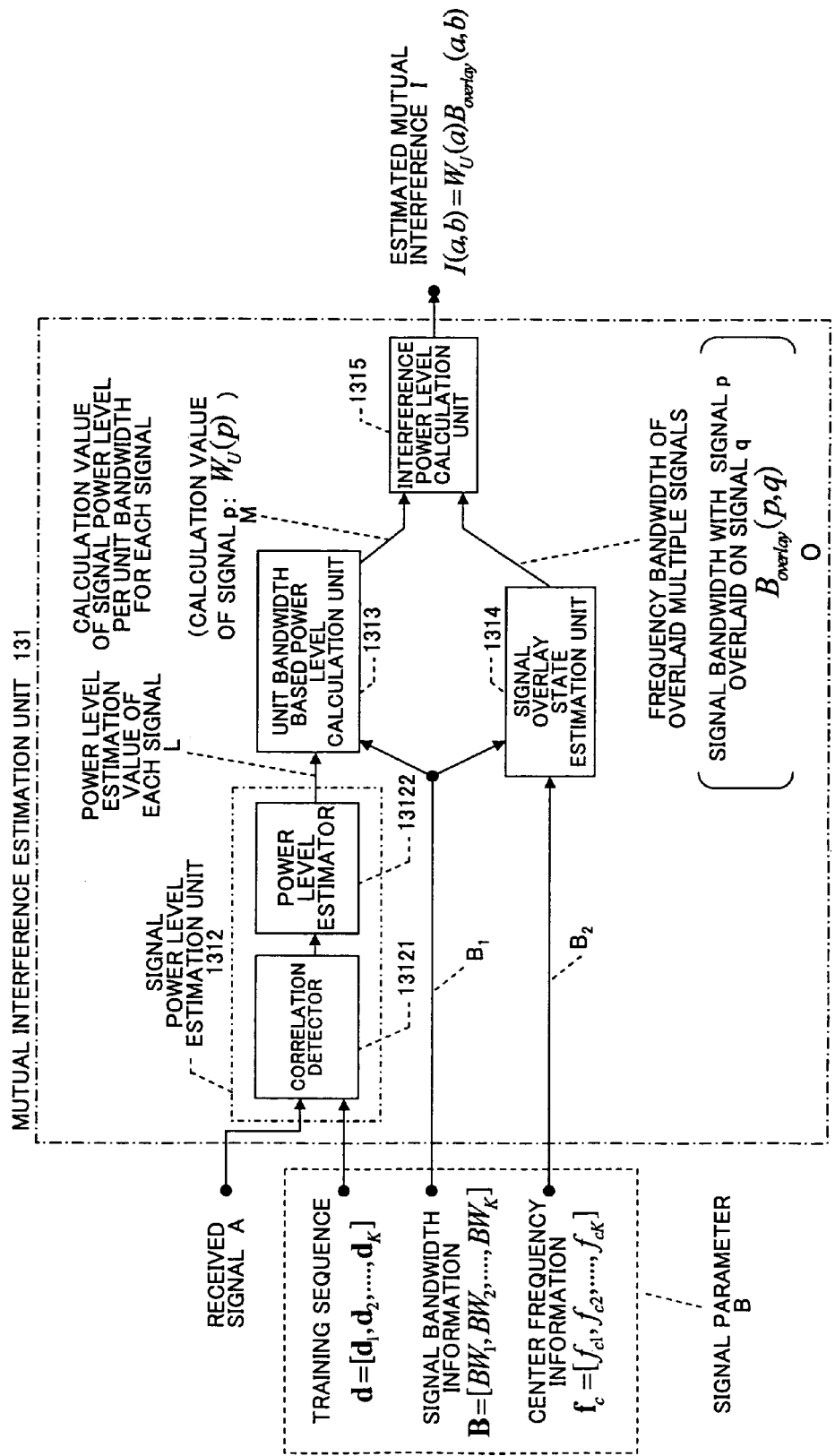
FIG. 11 is a block diagram illustrating another example of the mutual interference estimation unit.

FIG. 11 is another example of the mutual interference estimation unit 131. In this example, the propagation path estimation unit 1311 shown in FIG. 10 is removed, and the signal power estimation unit 1312 has a correlation detector 13121 and a power level estimator 13122. The correlation detector 13121 detects correlation of the received signal A using known symbol sequences (training sequences in the example shown in FIG. 11), and the power level estimator 13122 estimates the power levels of the respective signals based on the detected correlation values.

Figure 12:
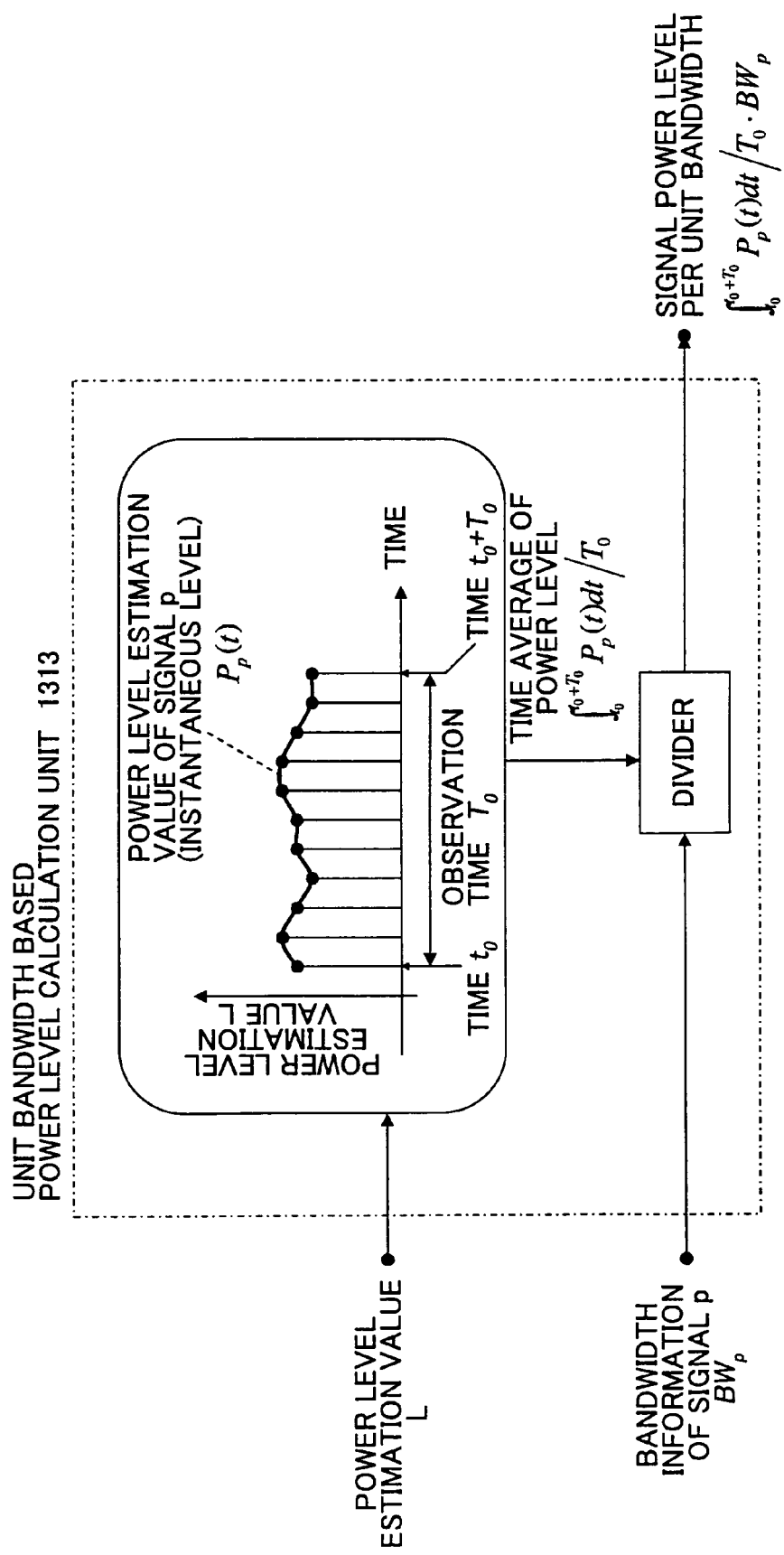
FIG. 12 is a block diagram illustrating an example of unit-bandwidth-based a power level calculation unit.

In FIG. 10 and FIG. 11, the power level estimation value L of each signal is supplied to the unit-bandwidth-based power level calculation unit 1313. The unit-bandwidth-based power level calculation unit 1313 calculates a signal power level per unit bandwidth |for| each signal using the signal bandwidth information, and supplies the calculation result to the interference power level calculation unit 1315. The power level per unit bandwidth of signal p is expressed as Wu(p). The unit-bandwidth-based power level calculation unit 1313 performs time integration on the instantaneous power levels P(t) of each signal estimated by the signal power level estimation unit 1312, as illustrated in FIG. 12, and averages the integration by the monitoring time to determine the power level per unit time. The power level per unit time is then divided by the signal bandwidth BW contained in the signal parameter B to determine the signal power level per unit bandwidth. The signal power level Wu(p) per bandwidth of signal (p) is expressed as $$W_U(p) = \frac{\int_{t_0}^{t_0+T_0} P_p(t)\,dt}{T_0 \cdot BW_p}. \quad (3)$$

Figure 13:
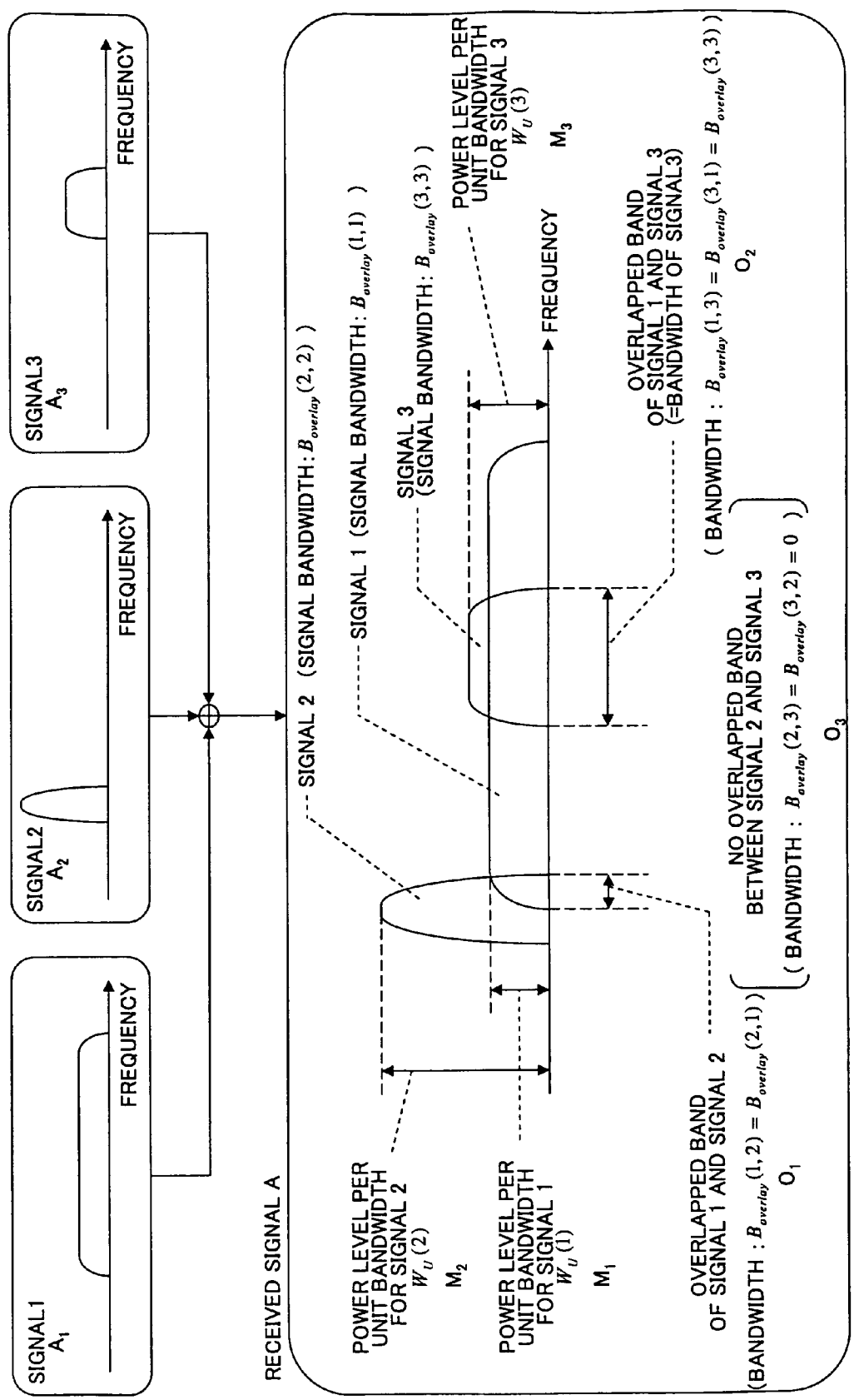
FIG. 13 is a schematic diagram illustrating the relation between each of the signals and signal power level per unit bandwidth.

FIG. 13 is a schematic diagram illustrating the relation between the signal power profiles of the respective signals and the signal power levels per unit bandwidth. In the example shown in FIG. 13, signal 1 (A1), signal 2 (A2), and signal 3 (A3) are superposed on each other in the received signal. The power of each signal is represented by the area defined by the power profile. The height of the power profile of each signal represents the power level per unit bandwidth. The power level per bit is obtained by dividing the power level per unit bandwidth by the number of bits transmittable in the unit bandwidth.

The signal overlay state estimation unit 1314 calculates the overlapped frequency bandwidth of the multiple signals contained in the received signal A, based on the information about the center frequency and the signal bandwidth. The calculation result is supplied to the interference power level calculation unit 1315. The overlapped frequency bandwidth of signal p overlaid on signal q is represented as $B_{overlay}(p, q)$ More detailed explanation is made of this in conjunction with FIG. 13. The overlapped area (interfering area) $O_1$ between signal 1 and signal 2 is located on the left end of frequency band of signal 1, and this overlapped bandwidth is expressed as $B_{overlay}(1, 2)$. The relation $B_{overlay}(1, 2) = B_{overlay}(2, 1)$ obviously holds. The overlapped bandwidth of signal p and signal p, that is, the signal bandwidth of signal p is expressed as $B_{overlay}(p, p)$. Since the overlapped area $O_2$ between signal 1 and signal 3 is equal to the signal band of signal 3, $B_{overlay}(1, 3) = B_{overlay}(3, 1) = B_{overlay}(3, 3)$ holds. Because overlapped area $O_3$ in which signal 2 and signal 3 overlap each other does not exist, $B_{overlay}(2, 3) = B_{overlay}(3, 2) = 0$ holds. Types of signal overlap are grouped as illustrated in FIG. 14, based on the center frequency and signal bandwidth, and the overlapped bandwidths of the respective types are expressed by Equation (4) through Equation (7) described below. In these Equations, $f_{cp}$ and $f_{cq}$ denote the center frequencies of signal p and signal q, respectively, and $BW_p$ and $BW_q$ denote the signal bandwidths of signal p and signal q. Signal p and signal q are arbitrary signals contained in the received signal, and they may be switched with each other in application of the Equations.

(a) If the frequency band used by signal p encompasses the frequency band used by signal q (that is, if $f_{cq}+BW_q/2 \leq f_{cp}+BW_p/2$ and $f_{cp}-BW_p/2 \leq f_{cq}-BW_q/2$), then $$B_{overlay}(p,q) = BW_q. \quad (4)$$

(b) If the upper bound of signal p resides in the frequency band used by signal q (that is, if $f_{cp}+BW_p/2 \leq f_{cq}+BW_q/2$ and $f_{cp}-BW_p/2 \leq f_{cq}-BW_q/2$), then $$B_{overlay}(p,q) = (f_{cp}+BW_p/2) - (f_{cq}-BW_q/2). \quad (5)$$

(c) If the lower bound of signal p resides in the frequency band used by signal q (that is, if $f_{cq}+BW_q/2 \leq f_{cp}+BW_p/2$ and $f_{cq}-BW_q/2 \leq f_{cp}-BW_p/2$) then $$B_{overlay}(p,q) = (f_{cq}+BW_q/2) - (f_{cp}-BW_p/2). \quad (6)$$

(d) If the frequency band used by signal p and that used by signal q do not overlap each other (that is, $f_{cq}+BW_q/2 \leq f_{cp}-BW_p/2$ or $f_{cp}+BW_p/2 \leq f_{cq}-BW_q/2$), then $$B_{overlay}(p,q) = 0. \quad (7)$$

The interference power level calculation unit 1315 calculates mutual interference I based on the calculation value M of signal power level per unit bandwidth of each of the signals and overlapped frequency bandwidth O of these signals. The interference signal power for signal q due to signal p is determined by multiplying the power level per unit bandwidth of signal p by the overlapped frequency band between signal p and signal q. Accordingly, the mutual interference I(p, q) are estimated from $$I(p,q) = W_U(p) B_{overlay}(p,q). \quad (8)$$

FIG. 15 is a schematic diagram illustrating mutual interference of signals. The area P in FIG. 15 denotes interference from signal 2 to signal 1, and the power level of this interfering area becomes about $W_u(2) B_{overlay}(2, 1) = I(2, 1)$. Similarly, the area Q denotes interference from signal 3 to signal 1, and the power level of this interfering area is about $W_u(3) B_{overlay}(3, 1) = I(3, 1)$. The total interference power for signal 1 becomes $I(2,1) + I(3,1)$. Since the power level of signal 1 is $W_u(1) B_{overlay}(1, 1) = I(1, 1)$, the estimated communication quality (SIR in this case) of signal 1 is expressed by $$CIR_{est}(1) = \frac{I(1, 1)}{I(2, 1) + I(3, 1)}. \quad (9)$$

The communication qualities of signal 2 and signal 3 are also calculated in a similar manner.

The estimated propagation path values J determined in FIG. 10 in this embodiment may in input to the equalization/decision unit 15 of the first embodiment shown in FIG. 3.

Figure 16:
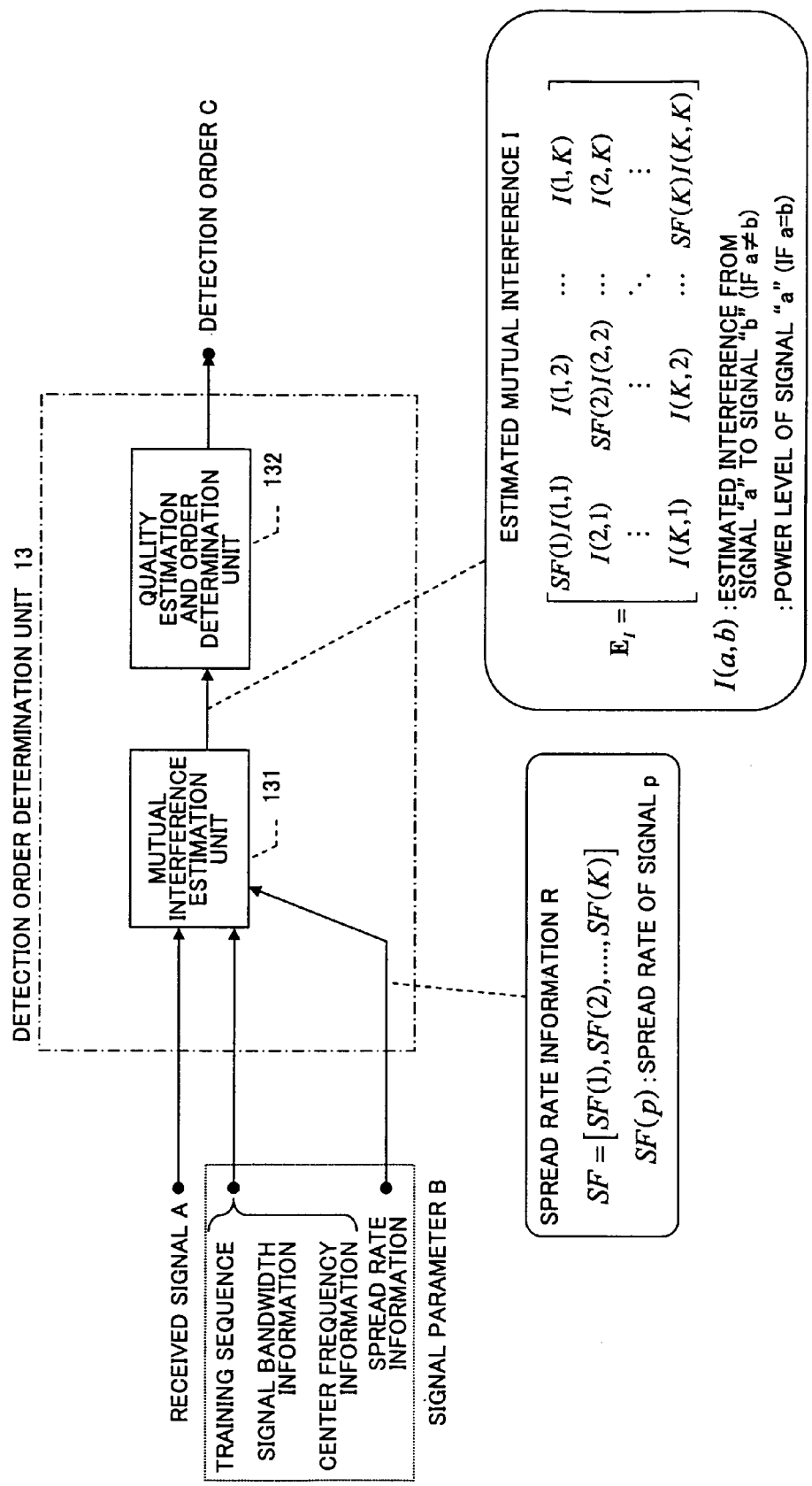
FIG. 16 is a block diagram illustrating still another example of the detection order determination unit.
Figure 17:
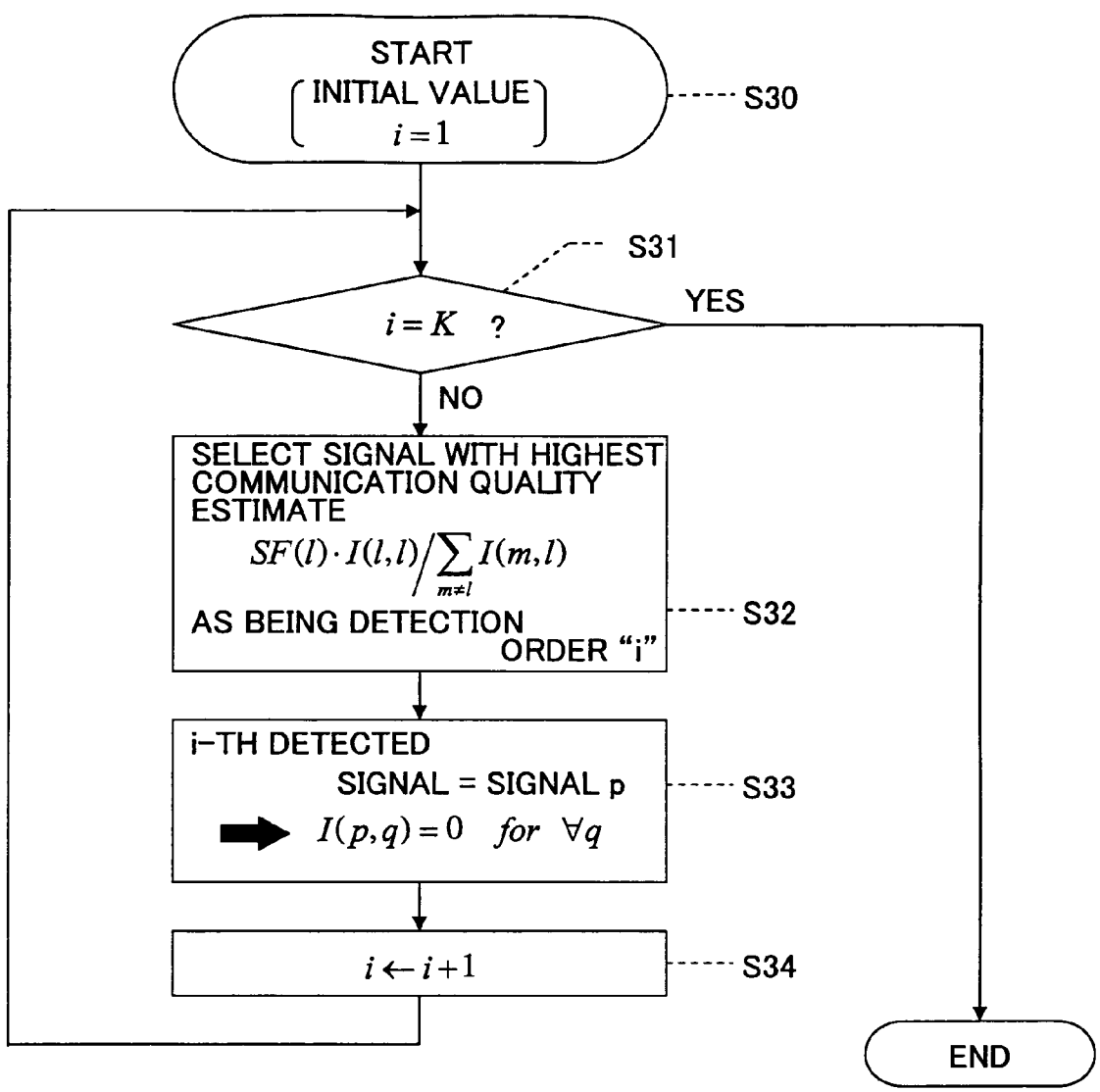
FIG. 17 is a flowchart showing the operation carried out by the quality estimation and order determination unit shown in FIG. 16.

FIG. 16 is a block diagram illustrating still another example of detection order determination unit 13, which example is applied to the case in which a code-spread signal is contained in the received signal, and FIG. 17 is a flowchart of the operation carried out by the quality estimation and order determination unit 132 shown in FIG. 16.

In FIG. 16, the mutual interference estimation unit 131 estimates mutual interference I, as in FIG. 6. In this process, the interference power level (p, p) is multiplied by the spreading factor SF(p) using spreading factor information R so as to produce SF(p)*I(p, p). This arrangement is applicable to non-spread signal by setting the spreading factor to "1". In this case, the power ratio of the desired signal to interference signals estimated in comparison to communication quality in step S32 of operation flow shown in FIG. 17 is calculated using $$\frac{SF(l) \cdot I(l, l)}{\sum_{m \neq l} I(m, l)}. \quad (10)$$

Accordingly, the detection sequence can be determined taking into account the spreading gain. This arrangement allows determination of detection sequence efficiently even if spread signals and non-spread signals coexist in the received signal, and accurate signal detection is realized.

Figure 18:
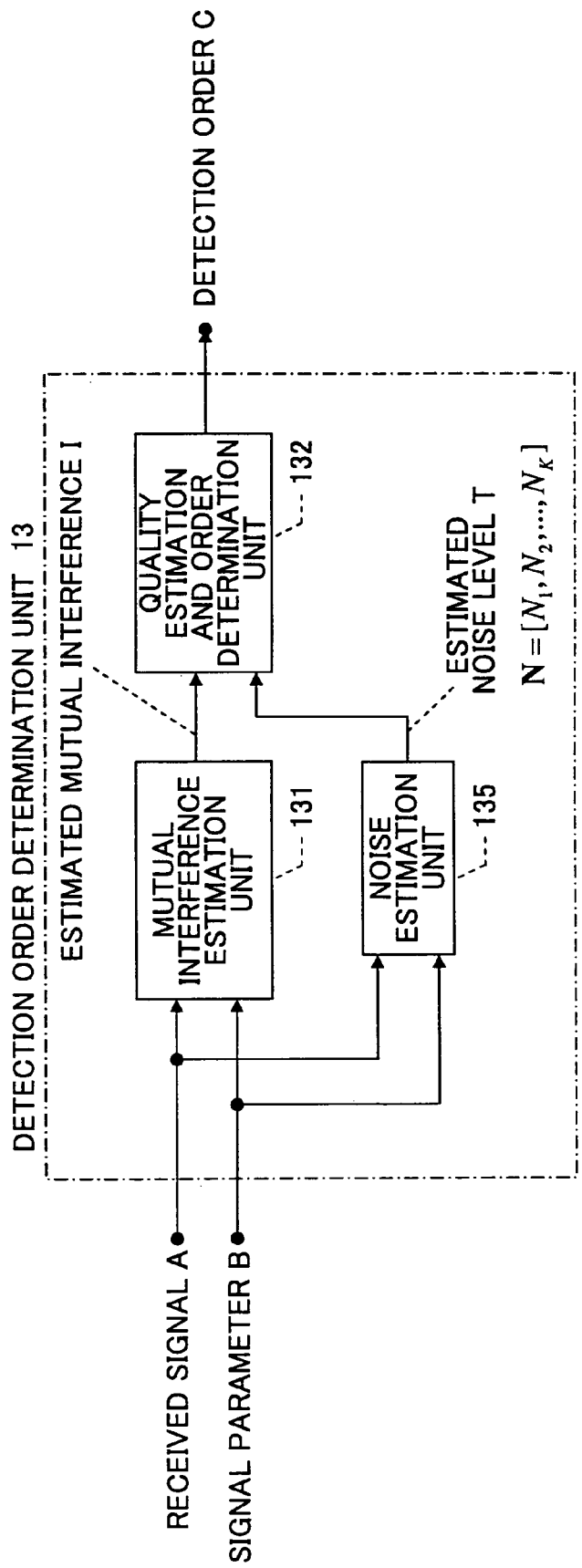
FIG. 18 is a block diagram illustrating still another example of the detection order determination unit.

FIG. 18 is a block diagram illustrating yet another example of the detection order determination unit 13, in which a noise estimation unit 135 is added to the structure shown in FIG. 6. The other components and operations are the same as those shown in FIG. 6, and explanation for them is omitted here.

Figure 19:
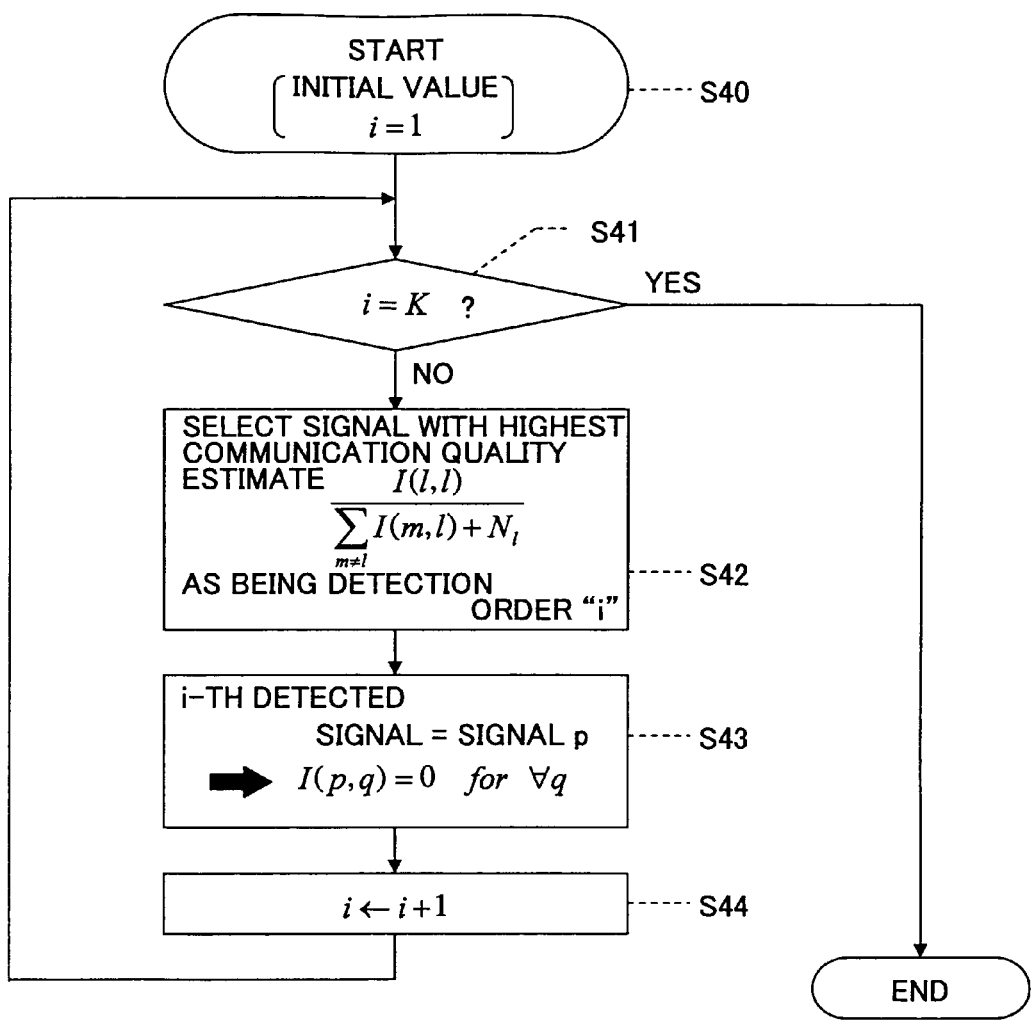
FIG. 19 is a flowchart showing the operation carried out by the quality estimation and order determination unit shown in FIG. 18.

The mutual interference estimation unit 131 estimates mutual interference between the signals contained in the received signal A based on the received signal A and the signal parameters B, and supplies the estimated mutual interference I to the quality estimation and order determination unit 132. The noise estimation unit 135 estimates a noise power level that each of the signals contained in the received signal A is subjected to, based on the received signal A and the signal parameters B, and supplies the estimated noise power level T to the quality estimation and order determination unit 132. The quality estimation and order determination unit 132 determines a detection sequence (detection order) of the signals based on the estimated mutual interference I and noise level T according to the operations flow shown in FIG. 19. The flow shown in FIG. 19 is basically the same as that shown in FIG. 7, but is different in that the noise level is considered to determine the communication quality when determining the detection order. First, the initial value "1" is set in the detection order "i" (i=1) (step S40). Then, it is determined whether the value "i" is equal to the number (K) of signals contained in the received signal (step S41). If i≠K (NO in S41), the process proceeds to step S42, while if i=K (YES in S41) the process terminates. In step S42, the power ratio of the desired signal to the sum of the interference level and the noise level is determined for each of the signals contained in the received signal A, and the signal with the highest as the i-th detected one.

Then, the interference power levels that the highest quality signal gives to the other signals and the desired wave power level of the highest quality signal itself are set to "0", whereby the total power level of that signal is treated as zero level (step S43). Then, the detection order "i" is incremented (i=i+1) (step S44), and the process returns to step S41. This arrangement is advantageous when multiple signals with different signal bandwidths overlap each other in using a certain frequency band because the influence of noise for each signal is estimated accurately, and the signal detection order can be determined efficiently.

This arrangement may be applied to the structure shown in FIG. 8. In this case, the desired signal to the interference plus noise power ratio ($E_b/(I_0+N_0)$) is calculated using the estimated noise level, and a bit error rate is estimated using the signal-to-interference-plus-noise ratio. The detection sequence (detection order) is then determined based on the estimated bit error rate.

Figure 20:
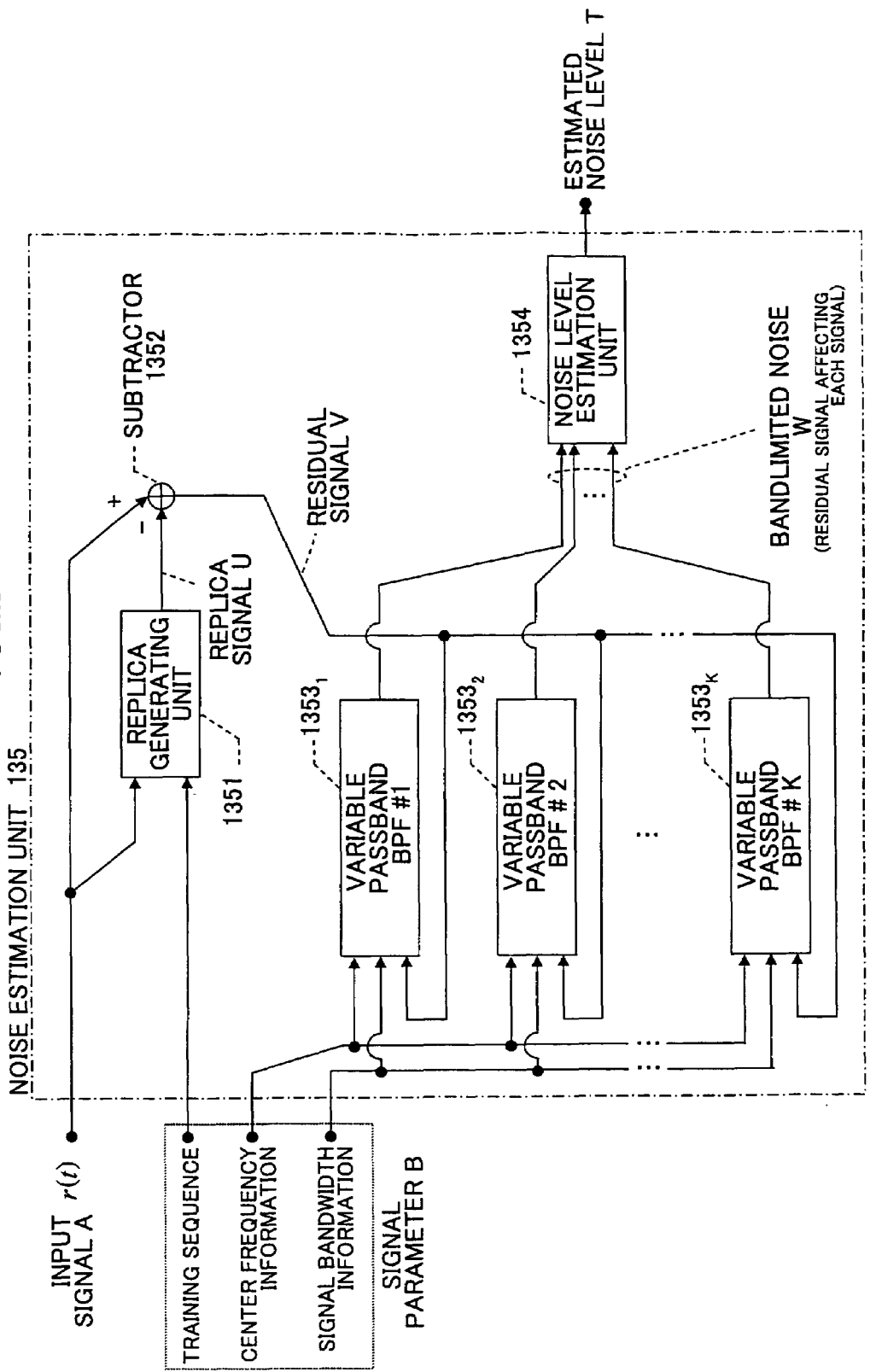
FIG. 20 is a block diagram illustrating an example of the noise estimation unit.
Figure 21:
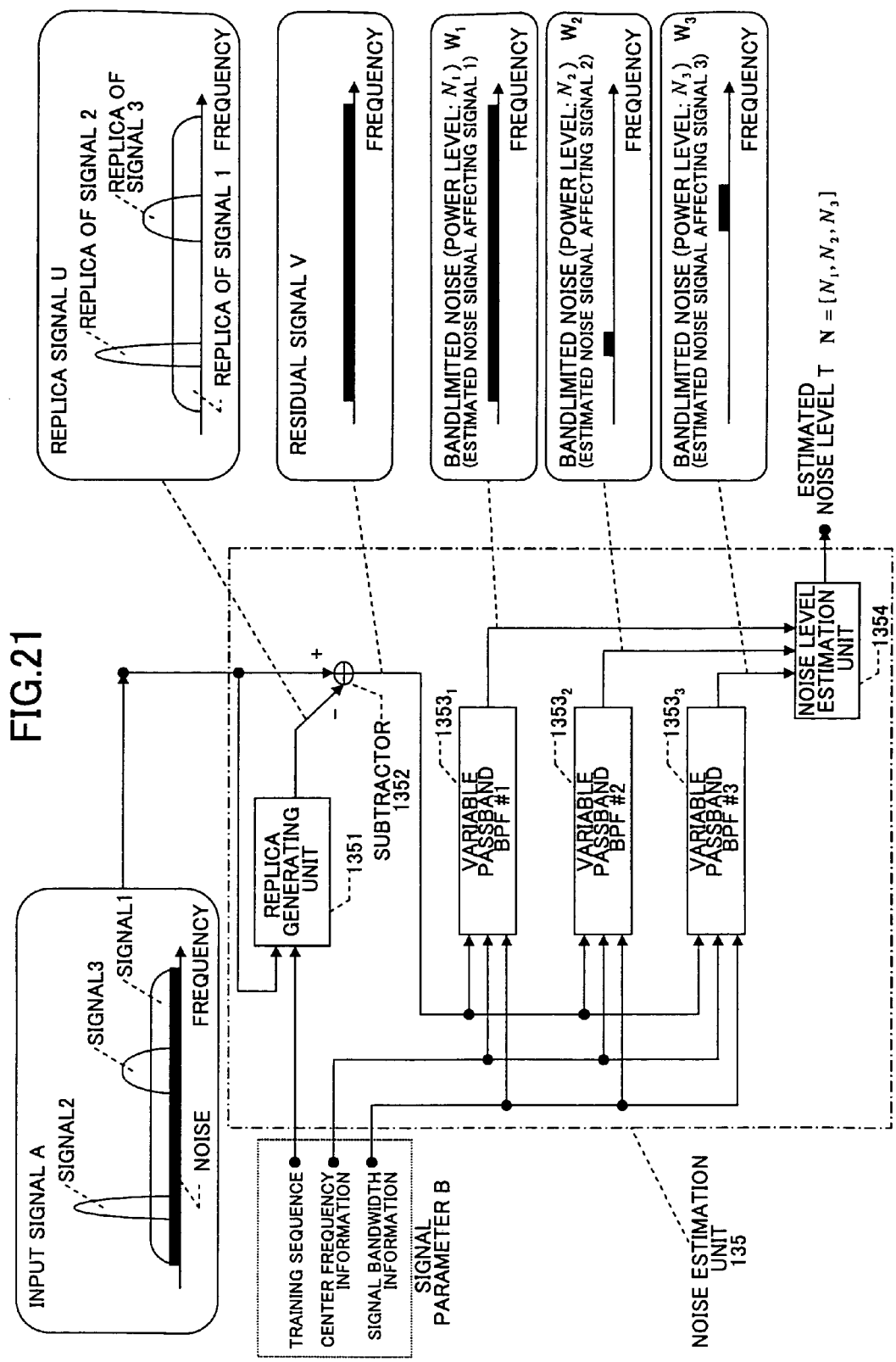
FIG. 21 is a schematic diagram illustrating noise estimation performed by the noise estimation unit.

FIG. 20 is a block diagram of the noise estimation unit 135. The noise estimation unit 135 includes a replica signal generating unit 1351, a subtractor 1352, bandpass filters 1353 (1353$_1$, 1353$_2$, ..., 1353$_k$), and a noise level estimation unit 1354. FIG. 21 is a schematic diagram illustrating the operation of the noise estimation unit 135.

The replica signal generating unit 1351 generates replicas of the signals contained in the received signal A based on the received signal A and the training sequences contained in the signal parameters B. These replicas are combined to generate and output replica U of the received signal A. The replica U is input to the subtractor 1352 to subtract the replica U from the received signal A. As a result, only the noise component is left, which component is output as a residual signal V and supplied to the bandpass filters 1353. Each of the bandpass filters 1353 suppress the out-of-band component of the residual signal V according to the frequency band of the associated signal contained in the received signal. To be more precise, assuming that the Fourier transform of the residual signal V is N(f) and that the bandpass filter 1353$p$ for signal p is Hp(f), the noise having passed through the bandpass filter is determined as the reverse Fourier transform of $N|_H(P, f)$ represented by Equation (11)

$$N_H(p,f)=N(f)H_p(f) \quad (11)$$

where Hp(f) has a passband corresponding to the frequency band f ($f_{cp}-BW_p/2 \leq f \leq f_{cp}+BW_p/2$) used by signal p. As illustrated in FIG. 21, noise components W1, W2 and W3 which have been bandlimited according to the frequency bands of the associated signals contained in the received signal A are output from the bandpass filters $1353_1$, $1353_2$ and $1353_3$, respectively. With this arrangement, the noise component remaining after the signal has passed through the variable passband BPF 11 shown in FIG. 3 can be estimated. The bandlimited noise components W are input to the noise level estimation unit 1354. The noise level estimation unit 1354 estimates the noise level that each signal in the received signal A is subjected to using Equation (12), and outputs the estimation result.

$$N_p = \int_{-\infty}^{\infty} |N_H(p, f)| df \quad (12)$$

In this manner, the noise contained in received signal A and the noise level that each signal is subjected to can be estimated.

Third Embodiment

Figure 22:
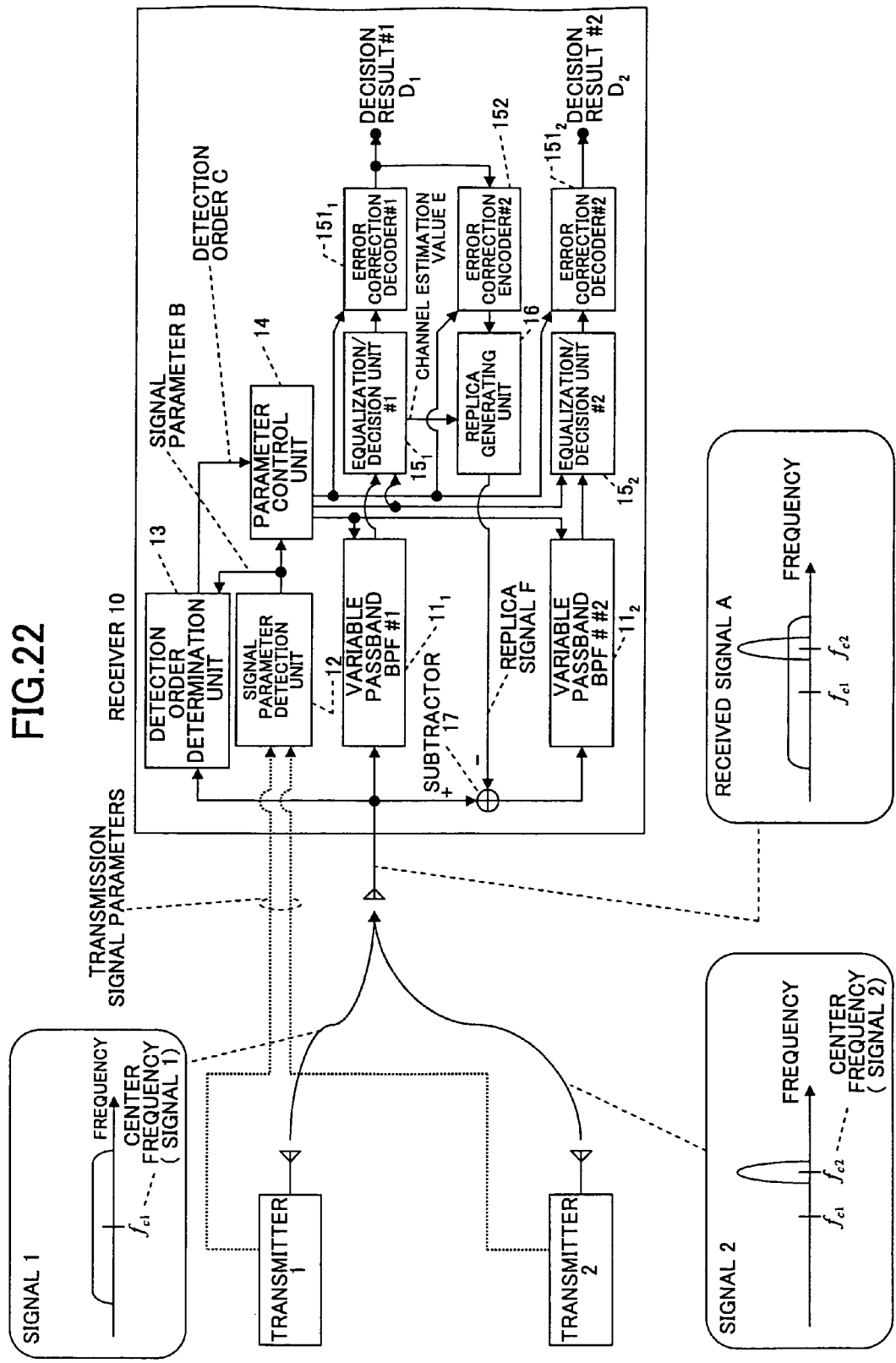
FIG. 22 is a block diagram illustrating a receiver with a signal detector according to the third embodiment of the invention.

FIG. 22 is a block diagram illustrating a receiver with a signal detector according to the third embodiment of the invention. In this embodiment, error correction decoders 151 ($151_1$, $151_2$) and an error correction encoder 152 are added. The output of the |equalization/decision unit #1 is connected to the input to the error correction decoder $151_1$, and decoded according to the error correction coding scheme supplied as the transmission signal parameter. The decoding result is output as decision result #1 (D1). The decision result #1 is then input to the error correction encoder 152, and coded using the coding scheme the same as that used on the transmission side. The coded signal is input to the replica generating unit 16. Replica signals can be generated using error-corrected signals. Consequently, degradation of replica signal generating accuracy due to decision errors is prevented, and accurate signal detection can be realized.

Fourth Embodiment

Figure 23:
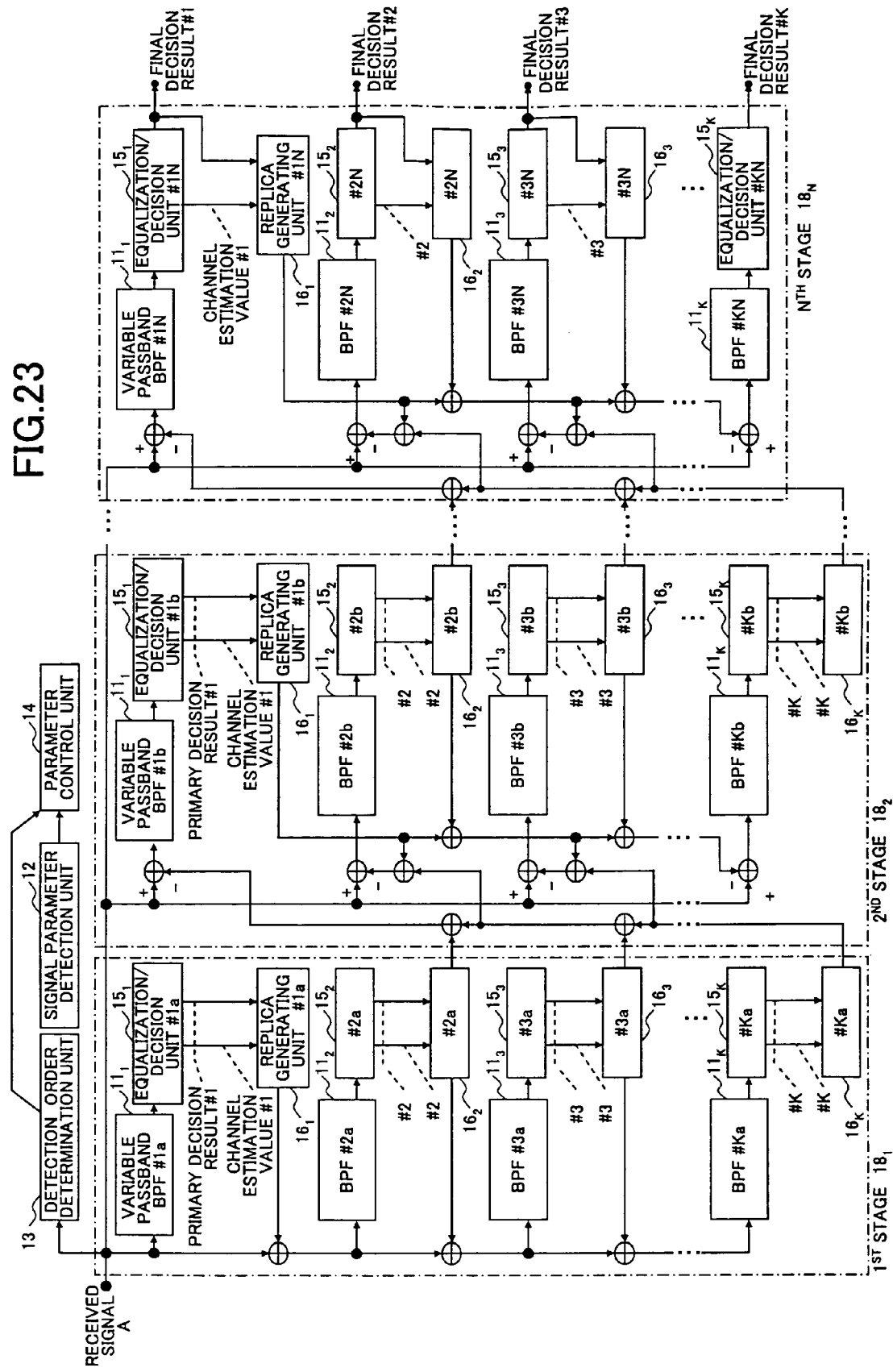
FIG. 23 is a block diagram illustrating a signal detector according to the fourth embodiment of the invention.

FIG. 23 is a block diagram of a signal detector according to the fourth embodiment of the invention. The signal detector includes multiple signal detection stages $18_1$, $18_2$, ..., $18_N$. Each stage 18 includes variable passband BPFs 11 ($11_1$, $11_2$, $11_3$, ..., $11_k$), equalization/decision units 15 ($15_1$, $15_2$, $15_3$, ..., $15_k$), and replica generating unit 16 ($16_1$, $16_2$, $16_3$, ..., $16_k$). Operations of the variable passband BPFs 11 and the equalization/decision units 15 are regulated by the signal parameter detection unit 12, the detection order determination unit 13 and the parameter control unit 14, as in the first embodiment shown in FIG. 3.

At the first signal detection stage $18_1$, the signals in the received signal are successively band-limited by the associated variable passband BPFs 11 according to the detection sequence determined by the detection order determination unit 13, and are subjected to equalization and decision to acquire channel estimation values and primary decision results. The replica generating units 16 generate replicas of the signals of the second and subsequent detection orders, and output the replicas to the second stage $18_2$.

At the second stage $18_2$, a residual signal obtained by subtracting the replicas of the signals of the second and subsequent detection order from the received signal A is supplied to the first variable passband BPF #1b, which is provided for the signal detection of the first detection target signal. The band-limited signal having passed through the variable passband BPF #1b is supplied to the associated equalization/decision unit #1b, and subjected to equalization and signal decision. The equalization/decision unit #1b outputs a channel estimation value and a secondary decision result to the associated replica generating unit #1b. The signal input to the variable passband BPF #1b of the second signal detection stage $18_2$ has little influence of interference because the replica signal produced at the first stage $18_1$ has been removed, while the received signal input to the variable passband BPF #1a of the first signal detection stage $18_1$ contains an interference signal. Accordingly, signal equalization and decision making can be performed under less influence of interference, as compared with the first signal detection stage, and a more accurate channel estimation value can be obtained. The replica generating unit #1b generates a replica of the first detection target signal based on the secondary decision result and the channel estimation value.

The next variable passband BPF #2b receives a residual signal obtained by subtracting the replicas of signals of the third and subsequent detection orders, as well as the replica of the first detection target signal produced by replica generating unit #1b, from the received signal. Similarly, the n-th variable passband BPF #nb provided for the signal to be n-th removed receives a residual signal obtained by subtracting the replicas of signals of the (n+1)th and subsequent detection orders generated at the first stage $18_1$ and the replicas of signals of first through to the (n−1)th detection orders generated at the second stage $18_2$ from the received signal. The bandlimited signal is subjected to signal equalization and decision. Each of the replica generating units 16 of the second stage $18_2$ generates a replica signal from the secondary decision result and the channel estimation value of the associated signal.

In this manner, the accuracy of the channel estimation value and the decision result at the q-th signal detection stage can be improved using the replica signal generated at the (q−1)th stage. If the number of signal detection stages is N, the decision result produced by the equalization/decision unit 15 of the N-th stage is output as the final decision result.

This arrangement can prevent errors in channel estimation values and decision results due to influence of interference signals, which errors may occur in the first embodiment shown in FIG. 3. Consequently, more accurate signal detection can be achieved.

Figure 24:
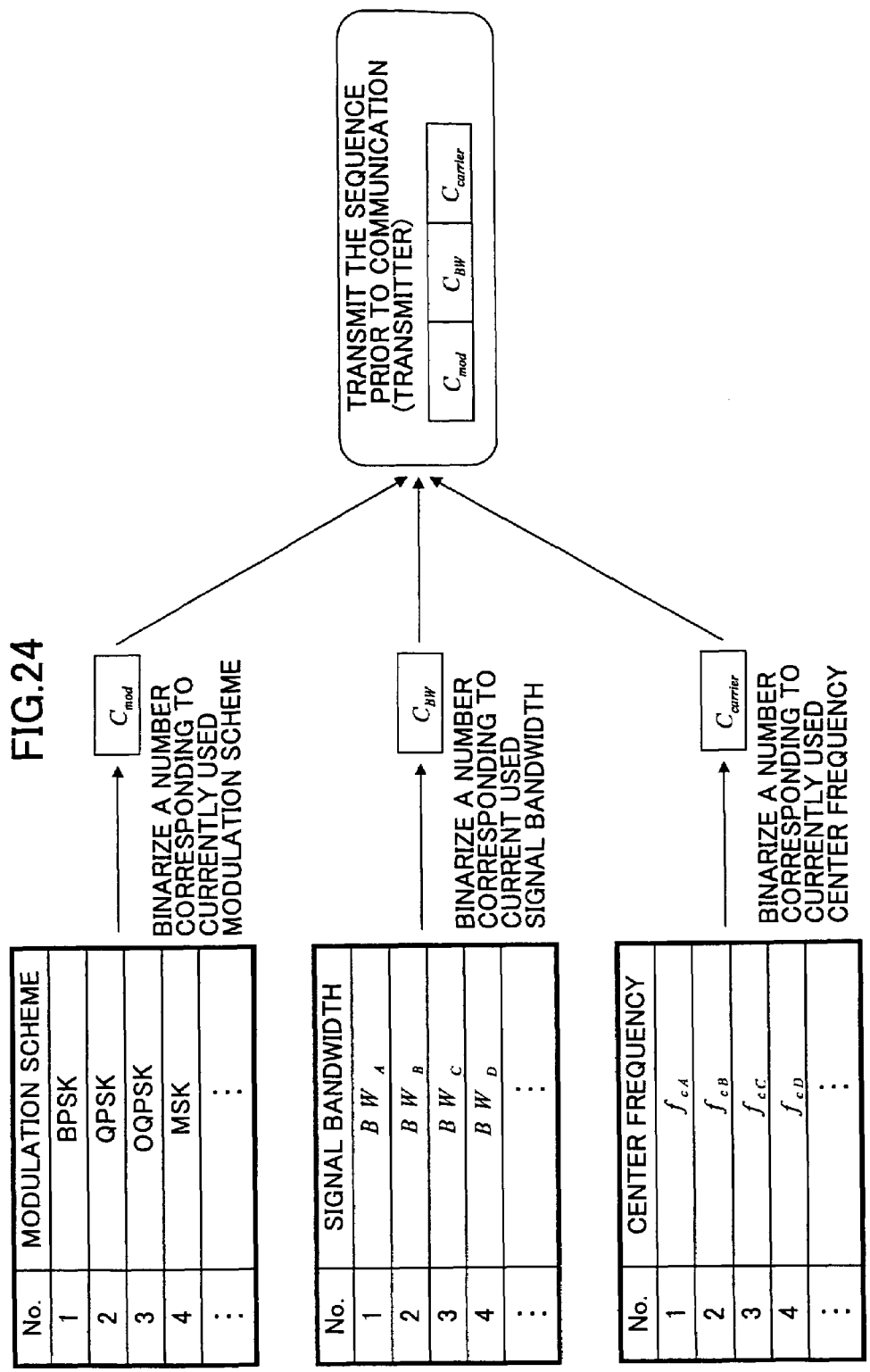
FIG. 24 is a schematic diagram illustrating an example of generating parameter information.
Figure 25:
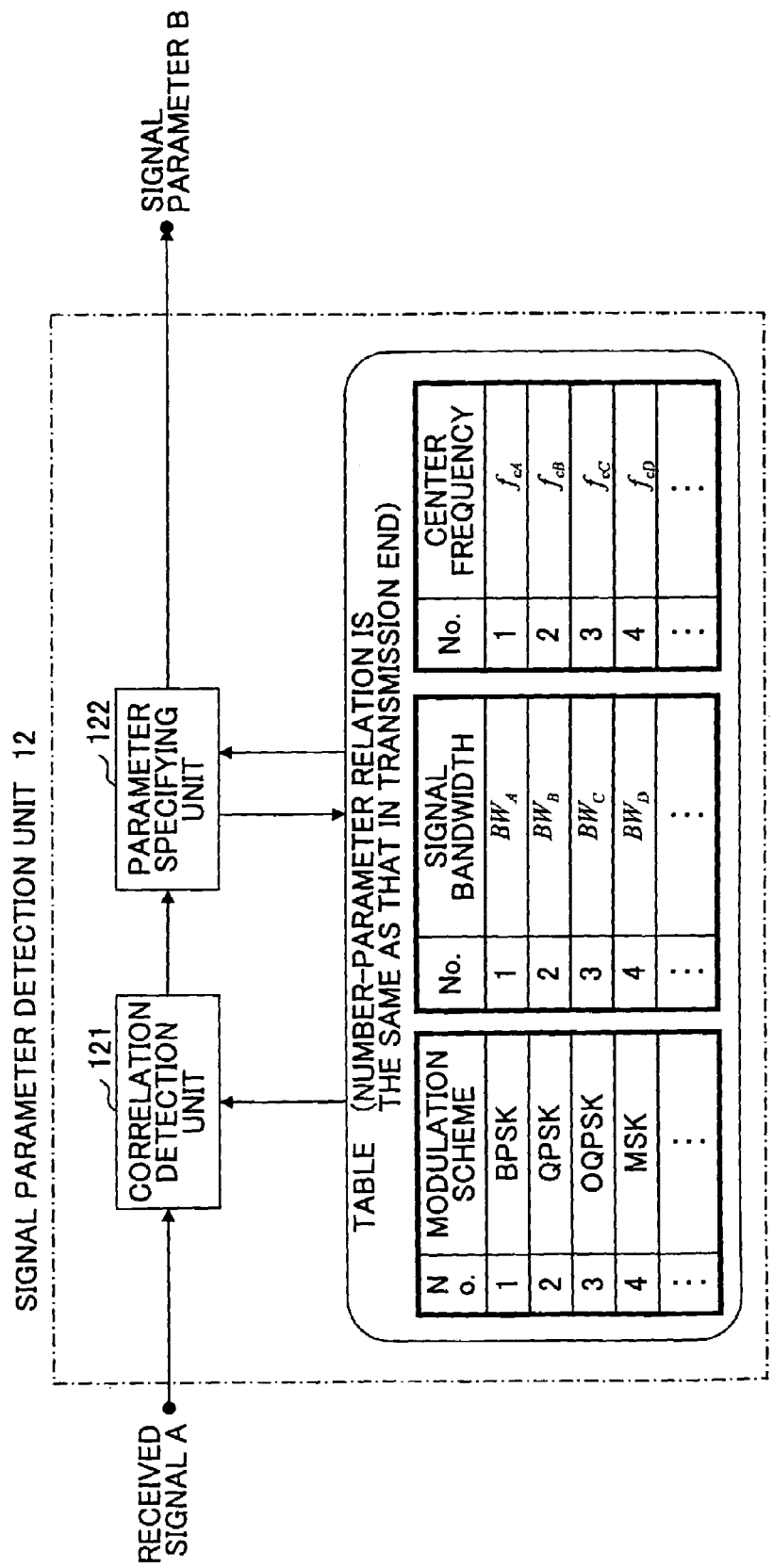
FIG. 25 is a block diagram illustrating a signal parameter determination unit.

FIG. 24 and FIG. 25 are schematic diagrams illustrating a signal parameter detection method. A transmitter and a receiver have a common table in which available modulation schemes, signal bandwidths, center frequencies, and other information are described. The transmitter generates a data sequence representing selected numbers (or items) corresponding to the signal parameters to be used, and transmits the data sequence prior to the actual communication.

For example, if a signal with center frequency fCB and bandwidth $BW_c$ is transmitted by QPSK, then a data sequence representing the numbers "2", "3", and "2" selected from the tables is generated and modulated, and transmitted prior to communication. The receiver has the same table set, and produces and modulates data sequences for all the possible combinations of the available parameters. The correlation detection unit 121 correlates the received data sequence with the produced data sequences. The parameter specifying unit 122 specifies the modulation scheme, the signal bandwidth, and the center frequency defined in the data sequence with the highest correlation, and outputs these parameters as signal parameters B. With this arrangement, it is unnecessary to use a separate control channel to transmit the signal parameters, and efficient use of the frequency resources can be realized.

Fifth Embodiment

Figure 26:
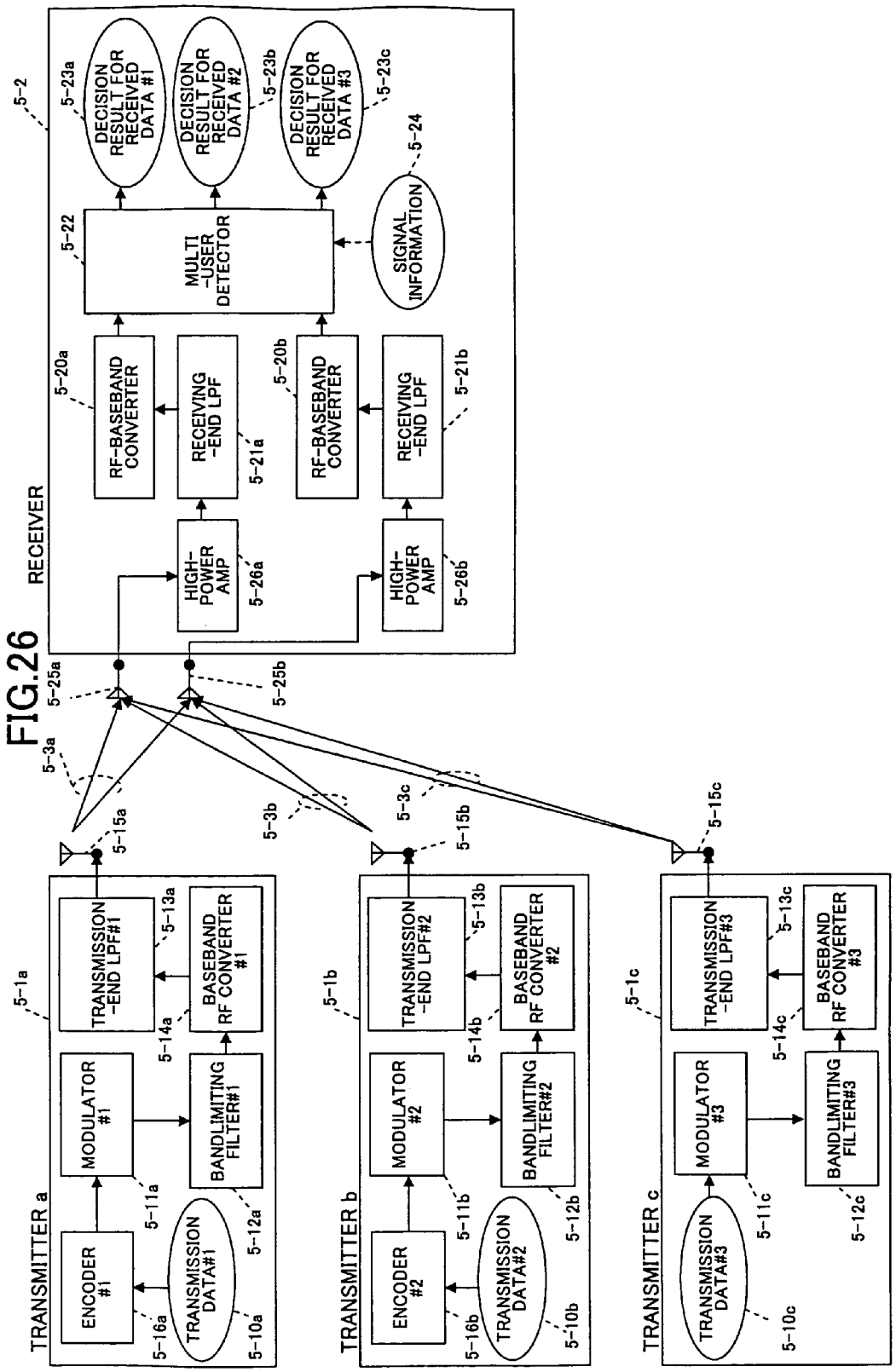
FIG. 26 is a block diagram illustrating a receiver with a multi-user detector according to the fifth embodiment of the invention.

FIG. 26 is block diagram illustrating a receiver with a multi-user detection unit detecting signals from multiple transmitters according to the fifth embodiment of the invention.

With the bandlimiting based multi-user detection described in the previous embodiments, signal detection and replica generation are carried out accurately by reducing unnecessary signal frequency components other than the detection target frequency with lower complexity. However, during the signal processing at a higher detection order, the signals in the detection order lower than that of the currently processed one are treated as noise. In the fifth embodiment, such interference signal components are also suppressed.

In FIG. 26, each of the transmitters 5-1 (5-1a, 5-1b, 5-1c) has a modulator 5-11 (one of 5-11a, 5-11b and 5-11c), a bandlimiting filter 5-12 (one of 5-12a, 5-12b and 5-12c), a transmission-side low-pass filter 5-13 (one of 5-13a, 5-13b and 5-13c), an RF converter 5-14 (one of 5-14a, 5-14b and 5-14c), and an antenna 5-15 (one of 5-15a, 5-15b and 5-15c). Transmitters 5-1a and 5-1b further have encoders 5-16a and 5-16b, respectively. The encoder 5-16 may be omitted if error correction is not performed.

The receiver 5-2 includes RF-to-baseband converters 5-20 (5-20a, 5-20b), receiving-side low-pass filters 5-21 (5-21a, 5-21b), a multi-user detector 5-22, high-power amps 5-26 (5-26a, 5-26b), and antennas 5-25 (5-25a, 5-25b). In this example, the number of antennas is two.

In the transmitters 5-1, transmission data items 5-10 (5-10a, 5-10b, 5-10c) or error-corrected decoded data items from encoders 5-16 are input to the associated modulators 5-11. Each of the modulators 5-11 modulates the input data and maps the data to the corresponding points in the signal space. The associated bandlimiting filter 5-12 shapes the waveform of the modulated signal supplied from the modulator 5-11. The baseband-to-RF converter 5-14 converts the bandlimited baseband signal to an RF signal through amplification and frequency conversion. The transmission-side low-pass filter 5-13 reduces high-frequency components of the frequency-converted signal. The filtered signal is transmitted from the antenna 5-15.

The signals transmitted from the antennas 5-15 are received at receiving antennas 5-25 via associated propagation paths 5-3 (5-3a, 5-3b, 5-3c). The received signal is amplified by high-power amp 5-26, and the noise components outside the received signal band are reduced by the receiving-side low-pass filter 5-21. The low-pass filtered RF signal is converted to a baseband signal by the RF-to-baseband converter 5-20, and the baseband signal is input to the multi-user detector 5-22. The multi-user detector 5-22 outputs received data decision results 5-23 (5-23a, 5-23b, 5-23c) from the baseband signal with reference to signal information as to the signals contained in the received signal.

Figure 27:
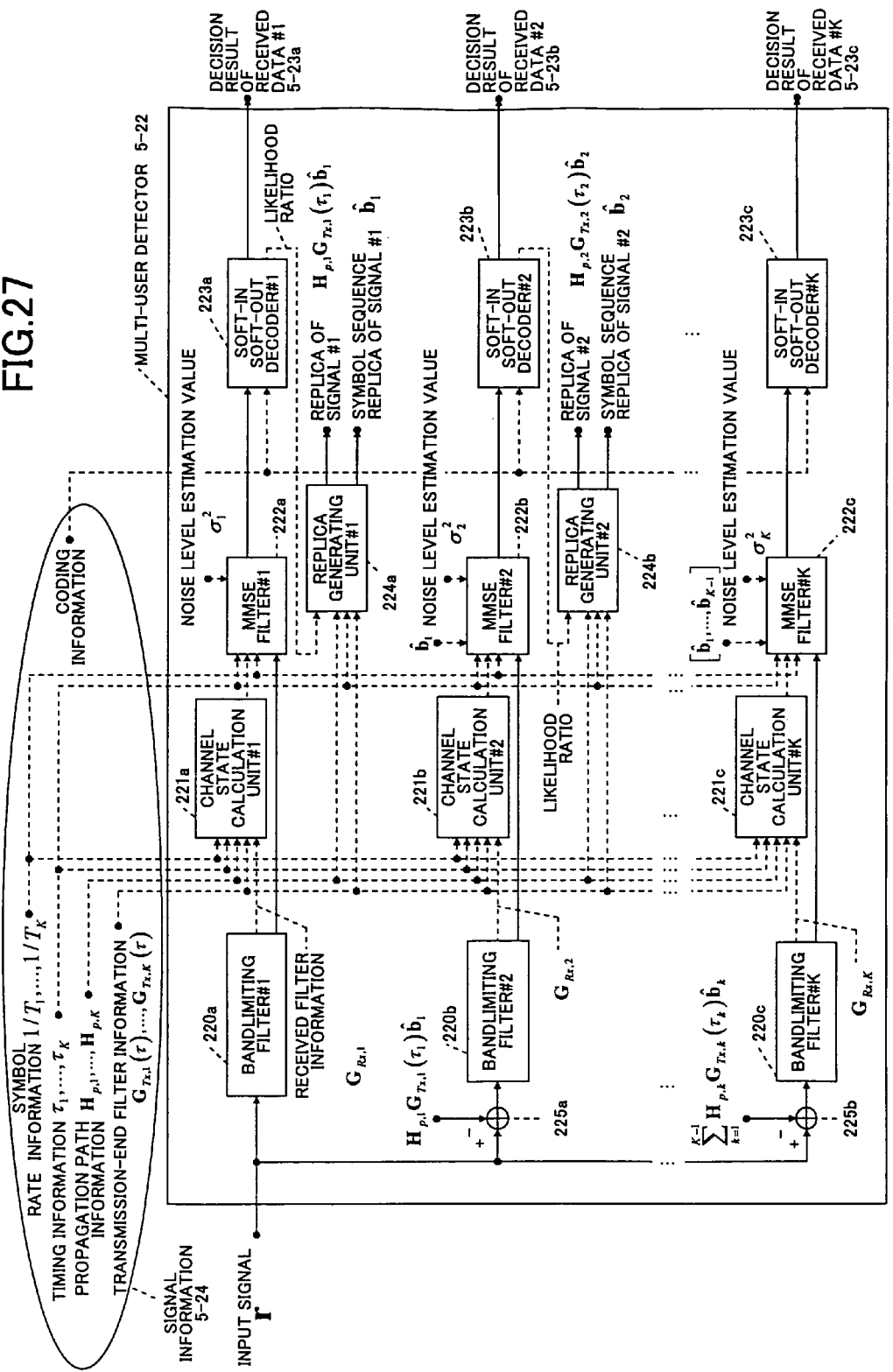
FIG. 27 is a block diagram illustrating an example of the multi-user detector shown in FIG. 26.

FIG. 27 is an example of the multi-user detector 5-22. The multi-user detector 5-22 includes bandlimiting filters 220 (220a, 220b, 220c), channel state calculation units 221 (221a, 221b, 221c), MMSE filters 222 (222a, 222b, 222c), soft-in soft-out decoders 223 (223a, 223b, 223c) and replica generating units 224 (224a, 224b), and subtractors 225 (225a, 225b).

The input signal "r" is bandlimited by the first bandlimiting filter 220a provided for the signal to be first detected. |Hereinafter, the signal to be k-th detected from the input signal is referred to as the "k-th detection target signal"|. The bandlimited signal is input to the MMSE filter 222a. The channel state calculation unit 221a calculates the channel state information, which information includes the effect of propagation paths and the low-pass and bandlimiting filters at the transmitter and the receiver, of the associated user signal based on the symbol rate information of the user signal, the timing information, information about propagation paths 5-3, and the transmission-side filter information, taking into account the ISI condition from the transmission-side bandlimiting filter 5-12 to the receiving-side bandlimiting filter 220a for the first detection target signal.

Assuming that the low-pass filters and 5-13 and 5-21 operate ideally, and that there is no signal distortion, then the input signal "r" is expressed as $$r = \sum_{k=1}^{K} H_{p,k} G_{Tx,k}(\tau_k) b_k + n \quad (13)$$

where $b_k$ denotes a modulated signal vector of the k-th detected target signal, $G_{TX,k}$ is a matrix of the bandlimiting filter at the transmitter, $H_{p,k}$ denotes a matrix representing the condition of the propagation path 5-3, n denotes a noise vector, K denotes the total number of the detection target signals, and $\tau_k$ denotes the arrival timing of each signal. The input signal "r" is also expressed as $$r = [r^*(0), \ldots, r^*(D_1)]^H \quad (14)$$

where $D_1+1$ is the number of sampling points of the first detected signal, the superscript asterisk denotes complex conjugate, superscript "H" denotes complex conjugate transpose, r(m) denotes a received signal at time $mT_{s1}$, and $T_{sk}$ denotes a sampling time interval of the k-th detection target signal.

Assuming that the number of symbols of the modulated signal to be transmitted is Mk, then the modulation signal vector $b_k$ of the k-th detected signal is expressed as $$b_k = [b^*_k(hd\,k-1), \ldots, b^*_k(0)]^H \quad (15)$$

where bk(m) denotes the (m+1)th modulated signal of the k-th detection target signal.

The transmission filter matrix GTx, k is $$G_{Tx,k}(\tau_k) = \begin{bmatrix} g_{Tx,k}(-(M_k-1)T_k - \tau_k) & \cdots & g_{Tx,k}(-2T_k - \tau_k) & g_{Tx,k}(-T_k - \tau_k) & g_{Tx,k}(-\tau_k) \\ g_{Tx,k}(T_{S1}-(M_k-1)T_k - \tau_k) & \cdots & g_{Tx,k}(T_{S1}-2T_k - \tau_k) & g_{Tx,k}(T_{S1}-T_k - \tau_k) & g_{Tx,k}(T_{S1}-\tau_k) \\ g_{Tx,k}(2T_{S1}-(M_k-1)T_k - \tau_k) & \cdots & g_{Tx,k}(2T_{S1}-2T_k - \tau_k) & g_{Tx,k}(2T_{S1}-T_k - \tau_k) & g_{Tx,k}(2T_{S1}-\tau_k) \\ \vdots & \ddots & \vdots & \vdots & \vdots \\ g_{Tx,k}(D_1 T_{S1}-(M_k-1)T_k - \tau_k) & \cdots & g_{Tx,k}(D_1 T_{S1}-2T_k - \tau_k) & g_{Tx,k}(D_1 T_{S1}-T_k - \tau_k) & g_{Tx,k}(D_1 T_{S1}-\tau_k) \end{bmatrix} \quad (16)$$

where $g_k(t)$ is a time response function of the bandlimiting filter 5-12 for transmitting the k-th detection target signal, which function is determined by the passband width of the k-th detection target signal, and $T_k$ denotes the symbol duration of the k-th detection target signal whose symbol rate is given by $1/T_k$.

The propagation path matrix $H_{p,k}$ is expressed as $$H_{p,k} = \begin{bmatrix} h_k(0,0) & h_k(0,-1) & h_k(0,-2) & \cdots & h_k(0,-D_1) \\ h_k(1,1) & h_k(1,0) & h_k(1,-1) & \cdots & h_k(1,-D_1+1) \\ h_k(2,2) & h_k(2,1) & h_k(2,0) & \cdots & h_k(2,-D_1+2) \\ \vdots & \vdots & \vdots & \ddots & \vdots \\ h_k(D_1,D_1) & h_k(D_1,D_1-1) & h_k(D_1,D_1-2) & \cdots & h_k(D_1,0) \end{bmatrix} \quad (17)$$

where $h_k(p, q)$ denotes a complex number representing the amplitude and the phase rotation of the q-th delay wave (whose delay time is $qT_{s1}$).

Using a matrix $G_{Rx,1}$ representing a receiving-side bandlimiting filter 220a for the first detection target signal and expressed as $$G_{Rx,1}(\tau_1) = \begin{bmatrix} g_{Rx,1}(-(M_1-1)T_1) & \cdots & g_{Rx,1}(-2T_1) & g_{Rx,1}(-T_1) & g_{Rx,1}(0) \\ g_{Rx,1}(T_{S1}-(M_1-1)T_1) & \cdots & g_{Rx,1}(T_{S1}-2T_1) & g_{Rx,1}(T_{S1}-T_1) & g_{Rx,1}(T_{S1}) \\ g_{Rx,1}(2T_{S1}-(M_1-1)T_1) & \cdots & g_{Rx,1}(2T_{S1}-2T_1) & g_{Rx,1}(2T_{S1}-T_1) & g_{Rx,1}(2T_{S1}) \\ \vdots & \ddots & \vdots & \vdots & \vdots \\ g_{Rx,1}(D_1T_{S1}-(M_1-1)T_1) & \cdots & g_{Rx,1}(D_1T_{S1}-2T_1) & g_{Rx,1}(D_1T_{S1}-T_1) & g_{Rx,1}(D_1T_{S1}) \end{bmatrix} \quad (18)$$

the signal having passed through this bandlimiting filter 220a is expressed as $$G_{Rx,1}^H r = \sum_{k=1}^{K} G_{Rx,1}^H H_{p,k} G_{Tx,k}(\tau_k) b_k + G_{Rx,1} n. \quad (19)$$

If the received signal is sampled at the arrival time of the first detection target signal, that is, at time $mT_{s1}+\tau_1$, then the arrival timing of the second through the k-th detection target signals is offset relatively by time $\tau_1$. Accordingly, the signal having passed through the receiving filter (bandlimiting filter) 220a becomes $$G_{Rx,1}^H r = \sum_{k=1}^{K} G_{Rx,1}^H H_{p,k} G_{Tx,k}(\tau_k - \tau_1) b_k + G_{Rx,1} n. \quad (20)$$

The channel state calculation unit 221a calculates a channel matrix of the k-th detection target signal as $$G_{Rx,1}^H H_{p,k} G_{Tx,k}(\tau_k - \tau_1), \quad (21)$$

using Equation (20). Similarly, the channel state calculation unit 221 in the m-th processing block calculates a channel matrix of the k-th detection target signal as $$G_{Rx,m}^H H_{p,k} G_{Tx,k}(\tau_k - \tau_m). \quad (22)$$

Figure 28:
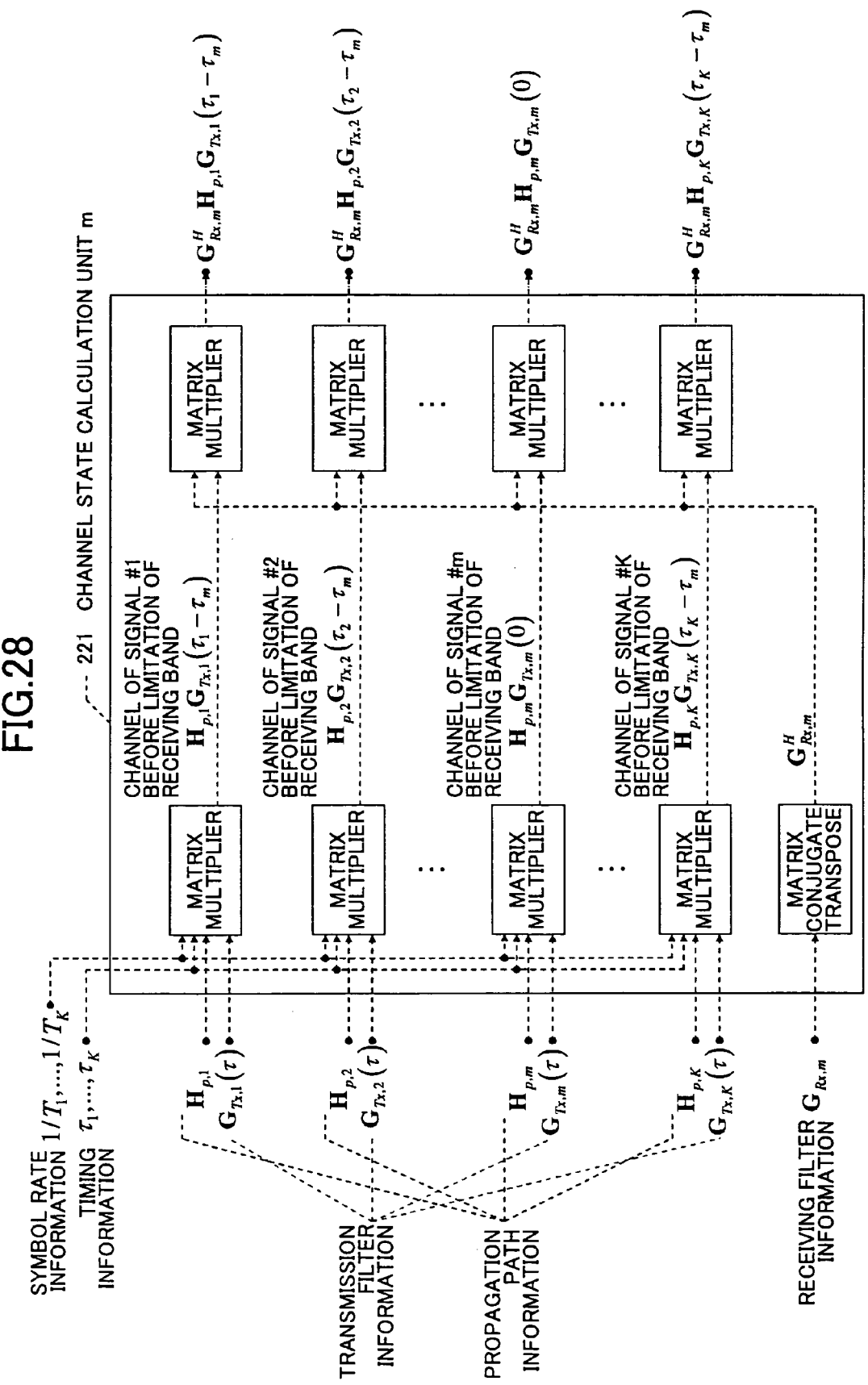
FIG. 28 is a block diagram illustrating an example of the channel state calculation unit shown in FIG. 27.

An example of the channel state calculation unit 221m in the m-th processing block for calculating the channel of the k-th detection target signal is illustrated in FIG. 28. In the following, the channel matrix calculated for the k-th detection target signal by the m-th processing block is expressed as $$Q_{k,m} = G_{Rx,m}^H H_{p,k} G_{Tx,k}(\tau_k - \tau_m), \quad (23)$$

for simplification purposes.

With this arrangement, channel state information can be calculated in a simple manner taking into account the intersymbol interference (ISI) due to the variety of pass-bands of the bandlimiting filters, which is not considered in the prior art Publication 2. In addition, complexity and degradation of channel estimation accuracy can be prevented as compared with the prior art Publication 3 in which fractional tap-spacing coefficient-variable filters are used.

The MMSE filter 222a calculates a filter coefficient $w(u)$ for the u-th symbol of the first detection target signal using equation of $$w_1(u) = \left( Q_{1,1} Q_{1,1}^H + \sum_{k=2}^{K} Q_{k,1} \Lambda_k Q_{k,1}^H + \sigma^2 I_1 \right)^{-1} Q_{1,1} e_u \quad (24)$$

where $e_u$ denotes a vector for detecting only the u-th line of the matrix, $\sigma^2$ denotes an average noise level, $I_1$ denotes a $M_1 \times M_1$ unit matrix, and $\Lambda k$ denotes a covariance matrix $\mathrm{Cov}(b_k - \hat{b}_k)$ that represents the difference between symbol sequence $b_k$ of the actually transmitted signal and symbol sequence replica $\hat{b}_k$ generated after demodulation. The covariance matrix converges to the unit matrix when no symbol sequence replica is generated, that is, when no subtraction is made to the input signal for the k-th detection target signal, and it converges to a zero matrix when a replica is generated and replica subtraction is performed accurately. In this case, no replica subtraction is performed for processing of the first detection target signal, and accordingly, $\Lambda k$ becomes a unit matrix.

Using the calculated filter coefficient $w_1(u)$, the received signal is equalized as expressed in Equation (25).

$$s_1(u) = w_1(u)^H G_{Rx,1} r \quad (25)$$

In this manner, equalization is performed on the other user signals that cause interference affecting the currently processed signal based on minimum mean square error (MMSE). Consequently, an accurate signal detection result can be obtained.

The equalized signal is input to the soft-in soft-out decoder 223a. The soft-in soft-out decoder 223a not only decides about the received data, but also calculates likelihood of the transmitted symbols. If the employed modulation scheme is BPSK, the log likelihood ratio (LLR) $\lambda_1(u)$ is expressed as $$\lambda_1(u) = \log\frac{Pr(s_1(u)\mid b_1(u)=+1)}{Pr(s_1(u)\mid b_1(u)=-1)}. \qquad (26)$$

Then, the replica generating unit 224 generates a replica of the symbol sequence using the likelihood determined by the soft-in soft-out decoder 223. If the replica of the symbol sequence is $$\tilde{b}_1 = [\tilde{b}^*_1(M_1-1), \ldots, \tilde{b}^*_1(0)]^H, \qquad (27)$$

then the replica of the u-th symbol is expressed as $$\hat{b}_1(u) = \tanh\left[\frac{\lambda_1(u)}{2}\right]. \qquad (28)$$

The symbol sequence replica is input to the next MMSE filter for the next detection target signal. In addition, a replica of the first detection target signal is generated by $$H_{p,1}G_{Tx,1}(\tau_1)\tilde{b}_1 \qquad (29)$$

taking into account the transmission filter and the receiving timing, and is supplied to the subtractor 225 arranged before the second bandlimiting filter to detect the second detection target signal.

In detection process of the second detection target signal, the replica of the first detection target signal is subtracted from the input signal. The subtraction is expressed as $$r - H_{p,1}G_{Tx,1}(\tau_1)\tilde{b}_1. \qquad (30)$$

Using this residual signal, the above-described operation performed on the first detection target signal is repeated for the second detection target signal. Similarly, the operation is performed on the m-th detection target signal using the residual signal expressed as $$r - \sum_{k=1}^{m-1} H_{p,k}G_{Tx,k}(\tau_k)\hat{b}_k. \qquad (31)$$

In detection of the m-th detection target signal, the symbols are successively demodulated, and a replica of the m-th detection target signal is generated using the demodulated signal. The inter-symbol interference due to the influence of the delay waves can be removed using the replica.

In this embodiment, the influence from only the transmission-side bandlimiting filter 5-12 and the receiving-side bandlimiting filter 220 is considered; however, low-pass filters may also causes distortion of signal waveforms and inter-symbol interference. In this case, the channel state calculation unit 221 may be configured to calculate the channel matrix of the k-th detection target signal in the m-th processing block according to $$G_{Rx,m}{}^H L_{Rx,m}{}^H H_{p,k} L_{Tx,k} G_{Tx,k}(\tau_k - \tau_m) \qquad (32)$$

where $L_{Tx,k}$ denotes an impulse response of the transmission-side low-pass filter 5-13 for the k-th detection target signal, and $L_{Rx,k}$ denotes an impulse response of the receiving-side low-pass filter 5-21. With this arrangement, multi-user detection can be performed taking into account the influence of the low-pass filters 5-13 and 5-21.

When the matrix size is large, complexity of the inverse matrix greatly increases. To overcome this problem, ISI symbols whose level is less than a prescribed level may be neglected in the channel matrix in order to make the channel matrix smaller and to reduce the complexity.

Figure 29:
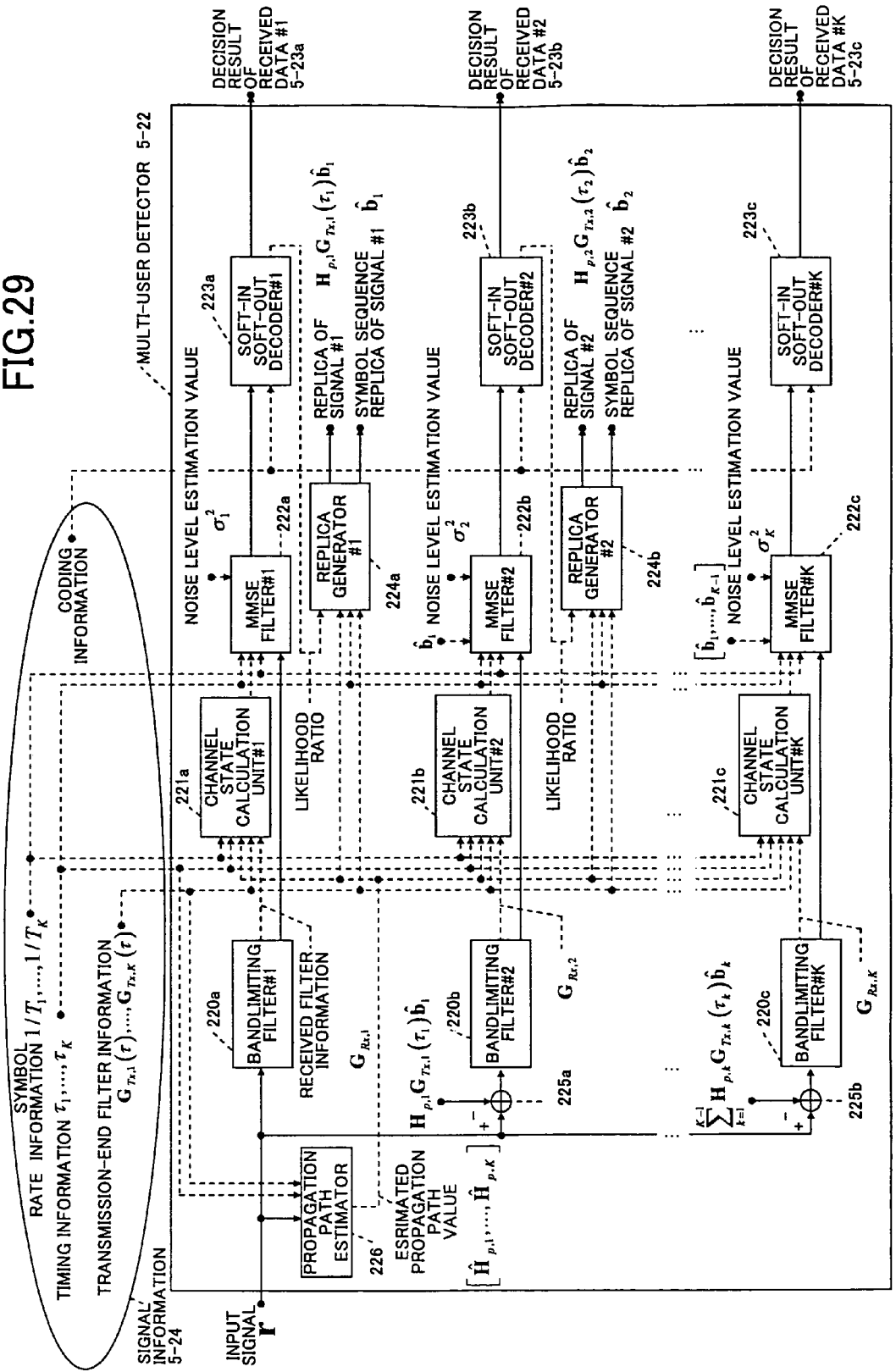
FIG. 29 is a block diagram illustrating an example of the multi-user detector that performs channel estimation for all the signals simultaneously.

FIG. 29 is a block diagram of the multi-user detector 5-22 configured to estimate channel state information of all the detection target signals simultaneously. In this structure, the channel estimator 226 estimates propagation path information $$[H_{p,1}, \ldots, H_{p,K}] \qquad (33)$$

to perform operation shown in FIG. 27 using the estimated propagation path value $$[\hat{H}_{p,1}, \ldots, \hat{H}_{p,K}] \qquad (34)$$

in place of the actual propagation path information.

The propagation path estimator 226 generates the replicas of the transmitted signals for each user by multiplying the transmission filter matrix by the reference symbols, such as training symbols or pilot symbols, taking into account the receiving timing of each signal into account, and performs propagation path estimation using the generated transmitted signal replica and a recursive least square (RLS) algorithm or a least mean square (LMS) algorithm. In this manner, multiplication is performed on the transmission filter matrix in advance so as prevent the ISI influence from appearing in the channel estimation. Consequently, the propagation paths can be solely and accurately estimated.

Figure 30:
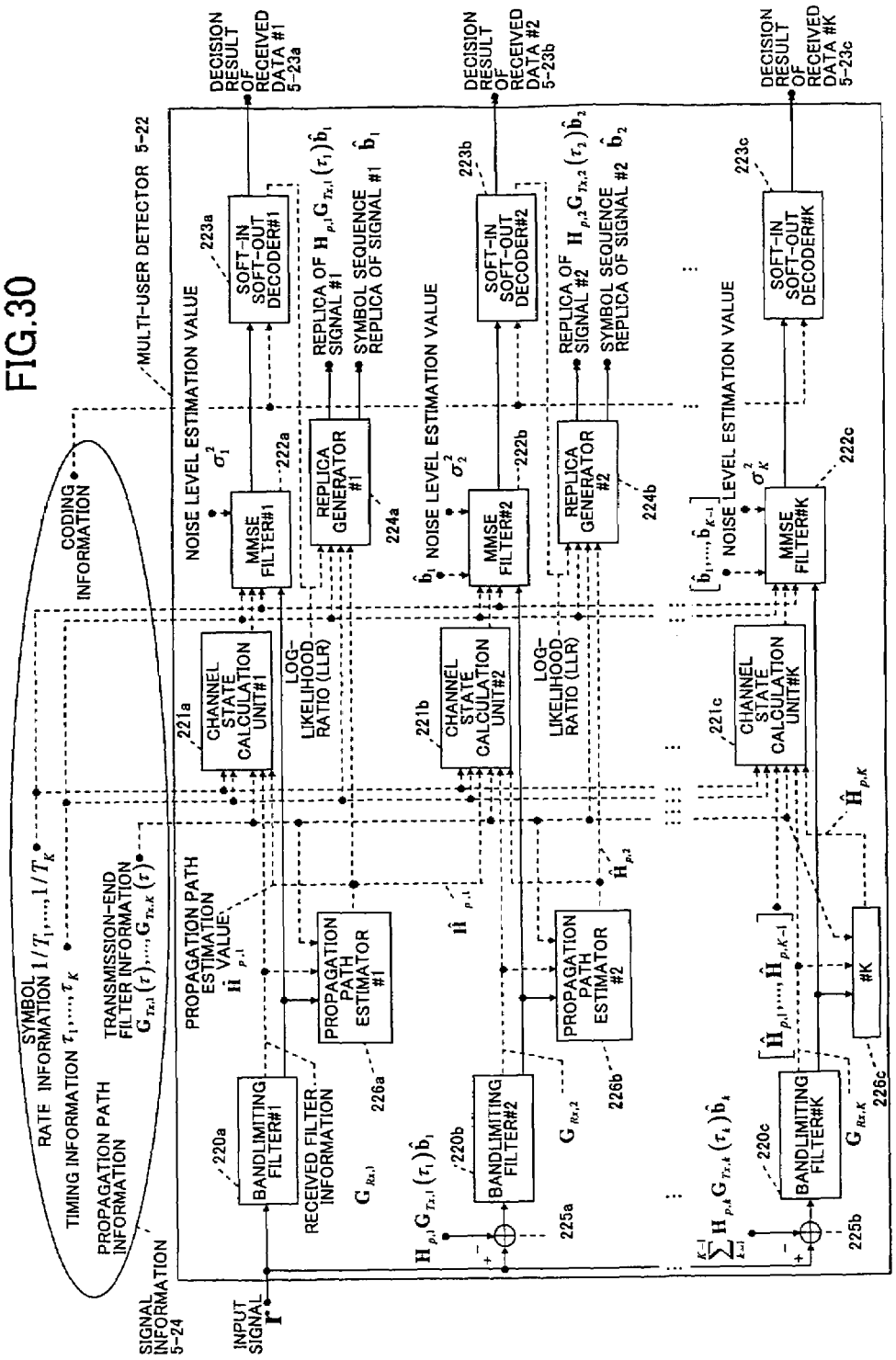
FIG. 30 is a block diagram illustrating an example of the multi-user detector that performs channel estimation for each of the signals separately.

FIG. 30 is another example of the block diagram of the multi-user detector 5-22, in which the channel state information of each of the detection target signal is estimated independently. In the m-th signal detection block, the propagation paths of the m-th detection target signal are estimated after the filtering through the bandlimiting filter 220 occurs. The propagation path estimation is performed using an RLS algorithm or an LMS algorithm taking into account the ISI due to the influence of the transmission filters, as in the simultaneous propagation path estimation.

Figure 31:
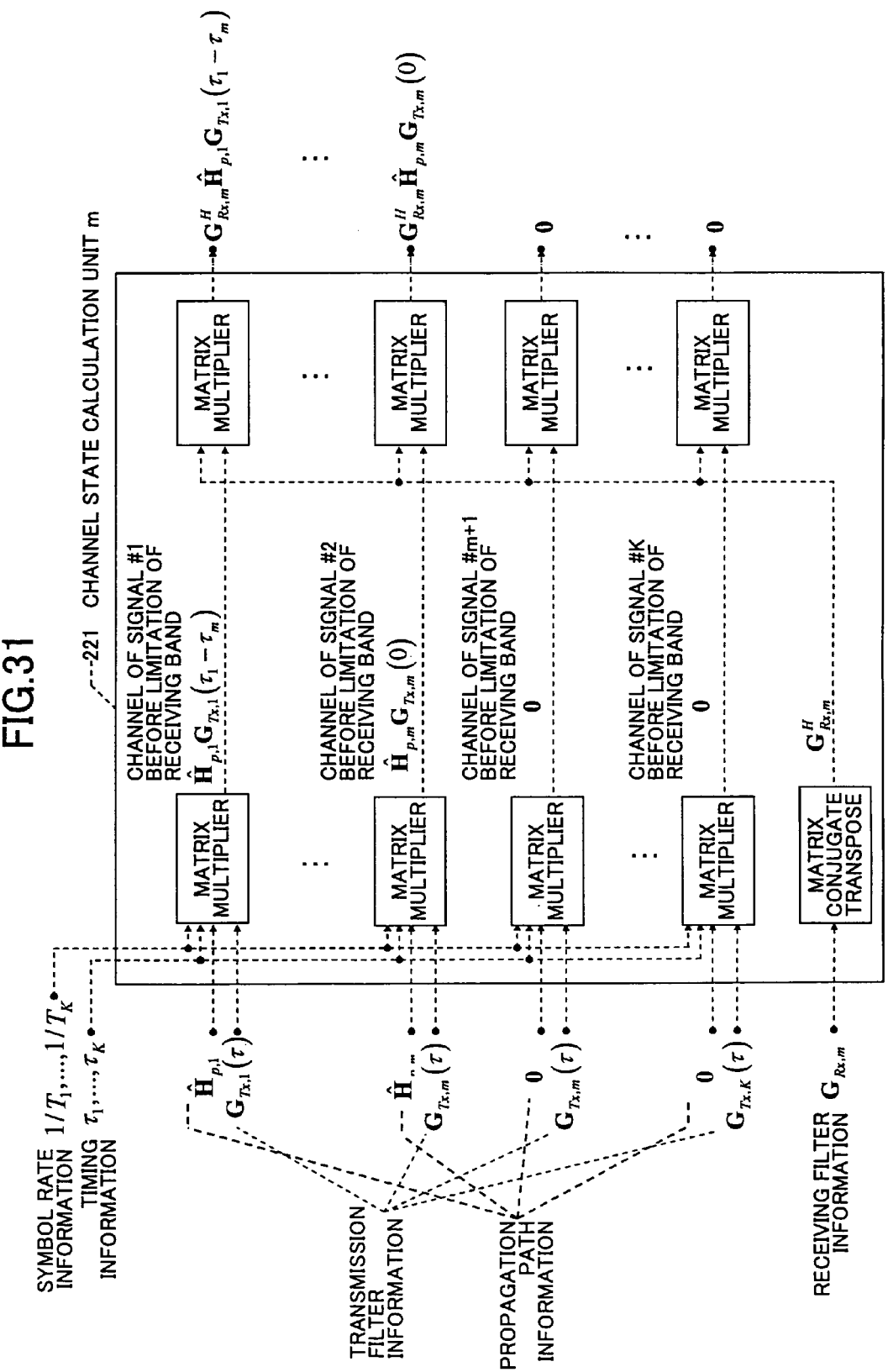
FIG. 31 is a block diagram illustrating an example of the channel state calculation unit shown in FIG. 30.

FIG. 31 is a block diagram of the channel state calculation unit 221 shown in FIG. 30. At the m-th channel state calculation unit 221, propagation path estimation has been performed for the first through the m-th detection target signals, and therefore, the estimated propagation path values for the (m+1) and the subsequent signals are set to zero.

Figure 32:
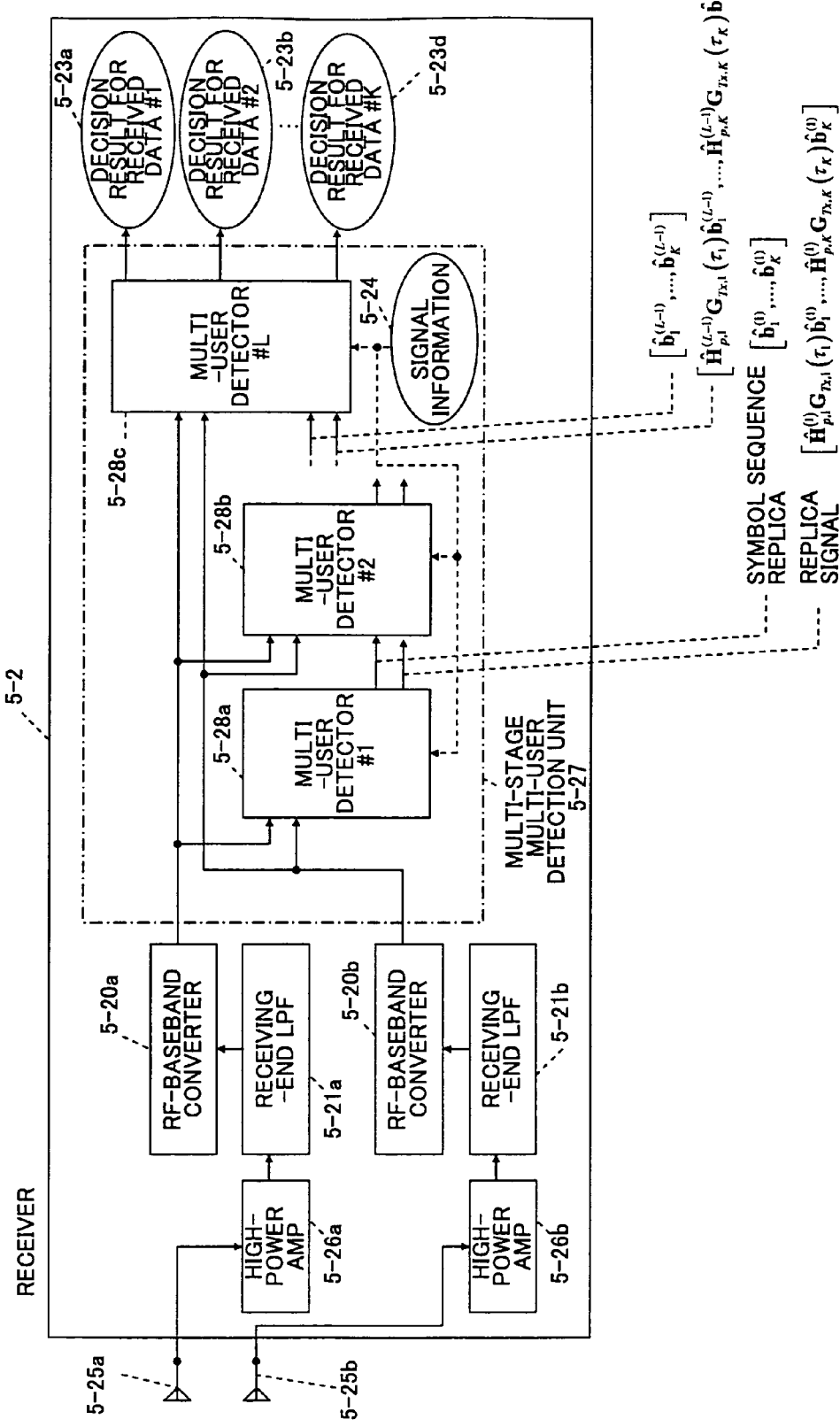
FIG. 32 is a block diagram illustrating a receiver with a multi-stage multi-user detection unit.

FIG. 32 is a block diagram of a receiver 5-2 having a multi-stage multi-user detection unit 5-27 consisting of a plurality of multi-user detectors 5-28 (5-28a, 5-28b, 5-28c) connected in cascade. A symbol sequence replica $$[\tilde{b}_1^{(l)}, \ldots, \tilde{b}_K^{(l)}] \qquad (35)$$

and a replica signal $$[\hat{H}_{p,1}{}^{(l)}G_{Tx,1}(\tau_1)\tilde{b}_1^{(l)}, \ldots, \hat{H}_{p,K}{}^{(l)}G_{Tx,K}(\tau_K)\tilde{b}_K^{(l)}] \qquad (36)$$

generated by the l-th multi-user detector 5-28 are used in the (l−1)th multi-user detector to iterate signal detection. Consequently, accuracy in multi-user detection is improved.

Figure 33:
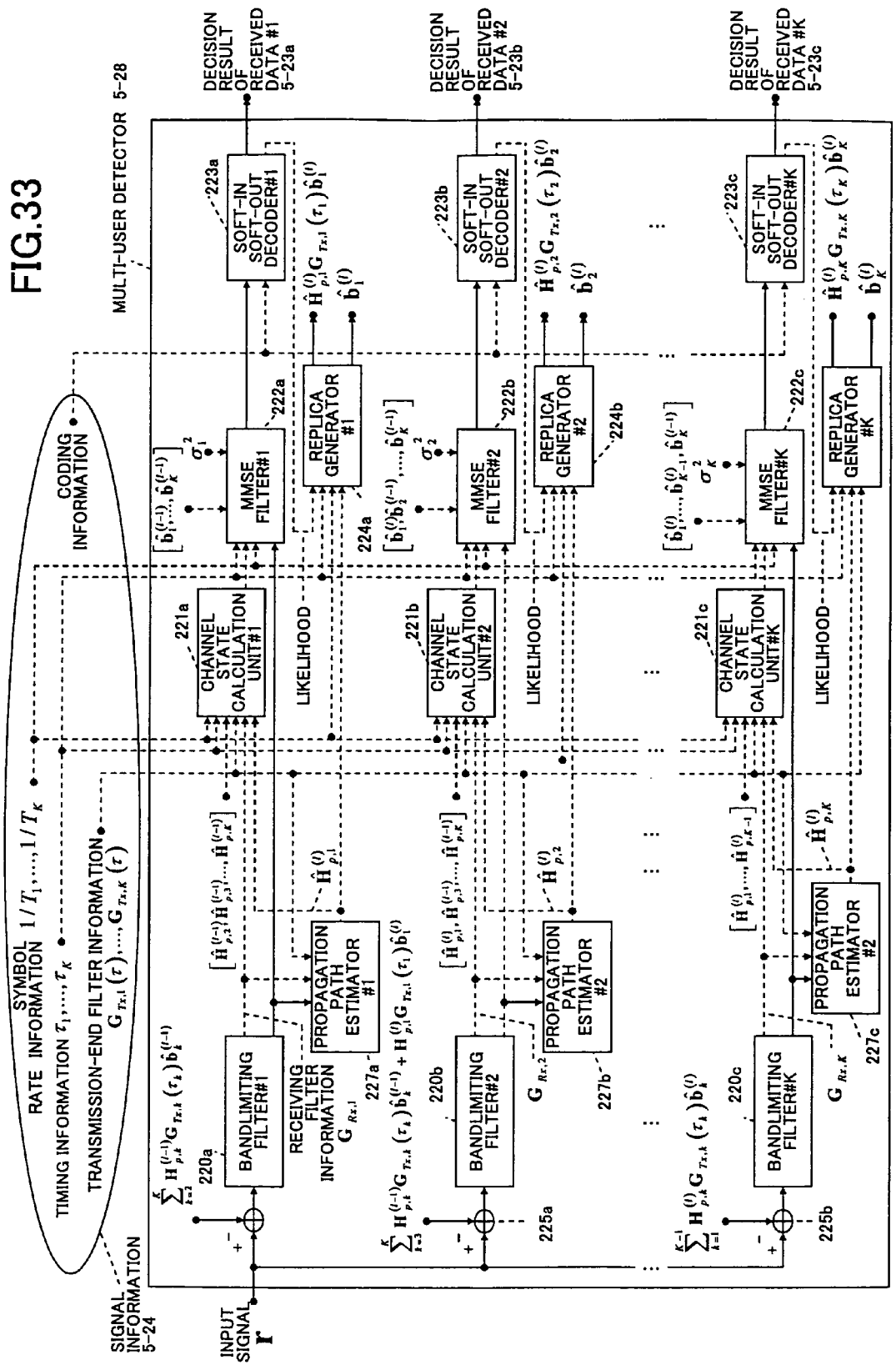
FIG. 33 is a block diagram illustrating an example of the multi-user detector used in the multi-stage multi-user detection unit.

FIG. 33 is a block diagram of the multi-user detector 5-28 used in the multi-stage multi-user detection unit 5-27. In the example shown in FIG. 33, the number of receiving antennas is two. The l-th multi-user detector 5-28 subtracts the replica signal generated at the (l−1)th multi-user detector from the input signal "r" in order to detect the first detection target signal. The subtraction is expressed as $$r - \sum_{k=2}^{K} H_{p,k}^{(l-1)} G_{Tx,k}(\tau_k) \hat{b}_k^{(l-1)}. \tag{37}$$

In detection of the m-th detection target signal, the replicas of the first through (m−1)th detection target signals have been updated, and therefore, a signal in which the updated replicas are subtracted is used. The subtracted signal is expressed as $$r - \sum_{k=m+1}^{K} H_{p,k}^{(l-1)} G_{Tx,k}(\tau_k) \hat{b}_k^{(l-1)} - \sum_{k=1}^{m-1} H_{p,k}^{(l)} G_{Tx,k}(\tau_k) \hat{b}_k^{(l)}. \tag{38}$$

Figure 34:
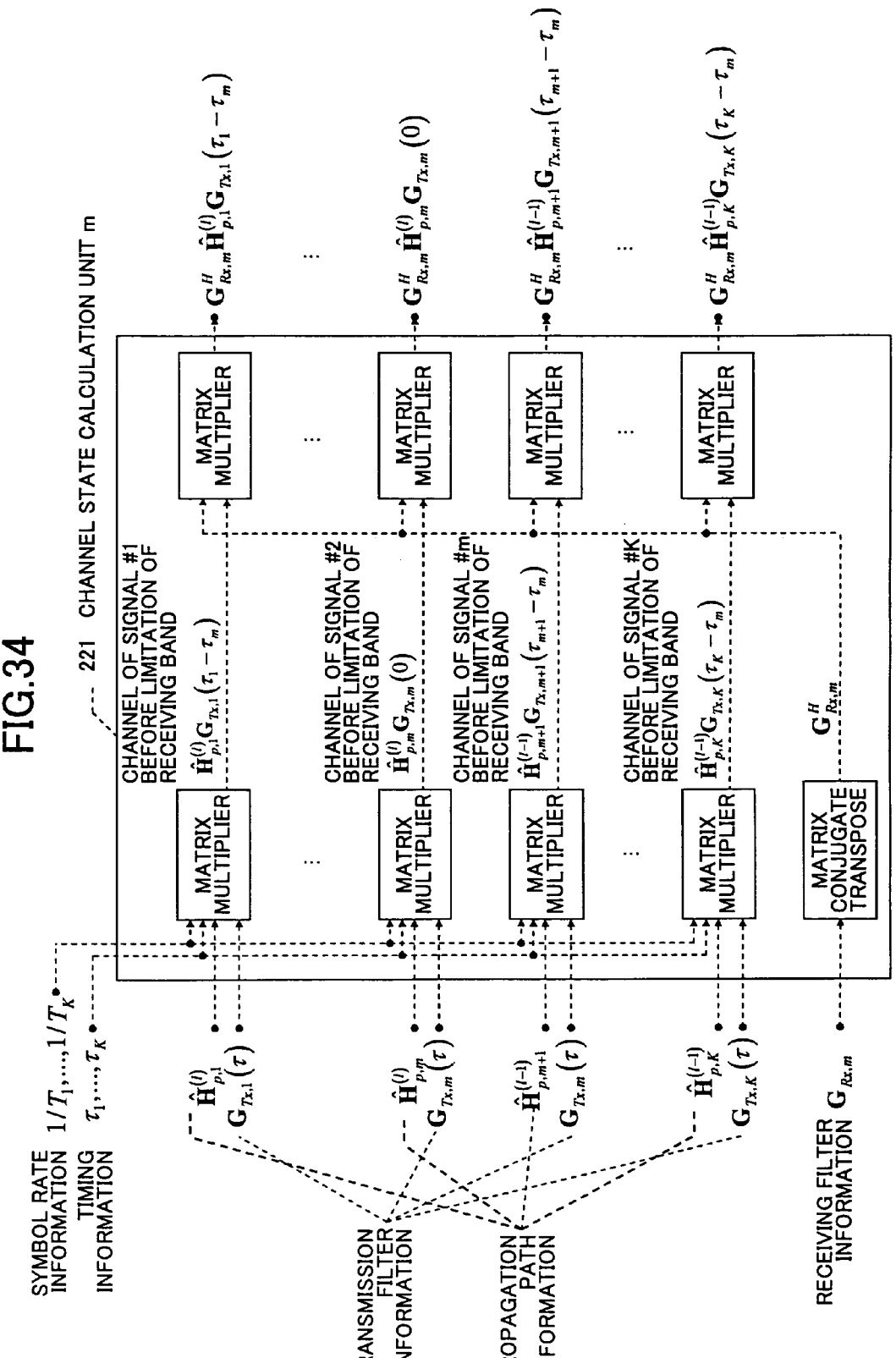
FIG. 34 is a block diagram illustrating an example of the channel calculation unit shown in FIG. 33.

FIG. 34 is an example of the channel state calculation unit used in the multi-stage multi-user detection unit 5-27. At the channel state calculation unit 221 for calculating the channel state information of the m-th detection target signal, the estimated propagation path values of the first through (m−1)th detection target signals have been updated, the updated estimated propagation path values are used to calculate the channel state information matrix. With this arrangement, the estimated propagation path values, and accordingly, the channel information matrices are sequentially updated, and accurate signal detection can be achieved.

As described above, multiple user signals contained in the received signal can be successively detected from the received signal according to the detection order determined based on the signal parameters. Thus, accurate signal detection can be achieved in the wireless communication environment in which different types of signals are transmitted sharing the same frequency band.

In the preferred example, the detection order determination unit has a mutual interference estimation unit that estimates a mutual interference between the signals contained in the received signal, and a quality estimation and order determination unit that determines the detection order for detecting the multiple signals from the received signal based on the estimated mutual interference and determines a communication quality which is to be used as a reference when deciding a signal at a given detection order. The quality is estimated by regarding mutual interference due to signals at higher detection orders than the given order as being equal to or less than a prescribed level in the determination of the detection order.

Accordingly, user signals with higher qualities are preferentially detected from the received signal.

The mutual interference estimation unit includes a power level estimation unit configured to estimate a reception power level of each of the plural signals contained in the received signal, a unit bandwidth based power level calculation unit configured to calculate a power level per unit bandwidth of each of the plurality of signals based on the signal parameter and the power level estimated by the power level estimation unit, a signal overlay estimation unit configured to estimate an overlapped frequency bandwidth, in which the plurality of signals overlap and interfere with each other, based on the signal parameters, and an interference level calculation unit configured to calculate the mutual interference based on the signal power level per unit bandwidth and the overlapped frequency bandwidth.

With this arrangement, the mutual interference between the signals contained in the received signal can be estimated readily.

Alternatively, the mutual interference estimation unit may have a propagation path estimator configured to estimate estimated propagation path values representing the impulse response of the propagation paths expanding along a time axis for each of the signals contained in the received signal. In this case, the signal power level estimation unit estimates the power level using the estimated propagation path value of a principal wave of each of the signals.

This arrangement allows accurate estimation of the power level of each signal contained in the received signal.

The signal power level estimation unit estimates the power level of each of the signals by, for example, correlation detection using known symbol sequences, each of the symbol sequences corresponding to one of the signals contained in the received signal.

With this arrangement, the power level of each signal can be estimated with a simple structure.

The power level calculation unit calculates the signal power level per unit bandwidth of each of the signals by averaging the signal power level estimation value estimated for a prescribed time duration using a signal bandwidth contained in the signal parameter.

With this arrangement, the interference level per unit bandwidth of each signal affecting the other signals can be derived.

The signal overlay estimation unit calculates an upper bound and a lower bound of a frequency band of each of the signals based on carrier frequency (center frequency) information and signal bandwidth information contained in the signal parameter, and compares the upper bound and the lower bound among all the signals contained in the received signal to estimate the overlapped frequency bandwidth.

Consequently, the mutually interfered signal bandwidth can be determined with simple computation.

The interference level calculation unit multiplies the signal power level per unit bandwidth of each of the signals by the overlapped frequency bandwidth to calculate the interference level between the signals contained in the received signal.

Consequently, interference levels between the user signals contained in the received signal can be estimated by simple computation.

In an alternative example, the detection order determination unit includes a mutual interference estimation unit configured to estimate a mutual interference caused by the signals contained in the received signal overlapping and interfering with each other on a frequency axis based on the received signal and the signal parameter of each of the signals, a noise estimation unit configured to estimate a noise level of each of the signals based on the received signal and the signal parameter, and a quality estimation and order determination unit configured to determine the order of detecting the signals from the received signal using the estimated mutual interference and the noise level and to estimate a communication quality that is to be used as a reference when deciding on a signal at a given detection order.

Because the detection order can be determined using the communication quality reflecting the noise in the received signal, accurate signal detection is realized.

The noise estimation unit includes a replica signal generation unit configured to generate a replica signal of the received signal from the received signal and the signal parameter, a subtractor configured to subtract the replica signal from the received signal and output a residual signal, a bandlimiting filter configured to suppress the out-of-band signal to signal in the residual signal to the bandwidths of the signals contained in the received signal based on an estimated noise waveform contained in the received signal, and a noise level calculation unit configured to calculate and output a noise level removed by the bandlimiting filter for each of the signal contained in the received signal.

The noise level affecting each of the signals in the received signal can be determined easily.

The detection order determination unit gives a higher detection order to a signal with a higher communication quality.

Determination error can be reduced for those signals ranked at higher detection orders, and accurate signal detection can be realized.

The signal detector may further comprise a replica generator configured to generate a replica of the received signal using a decision result and a channel estimation value produced by equalization/decision unit. In this case, the signal detector has multiple stages of signal detection, and each stage is defined by a combination of the variable passband bandpass filter, the equalization/decision unit, and the replica generator. At each stage, the replica signal produced in the previous stage is subtracted from the received signal, and the bandlimiting and the equalization and decision making are performed using the residual signal.

By repeating equalization using the multi-stage signal detection, accurate channel estimates can be obtained, which then leads to accurate signal detection.

The signal parameter of each of the signals is estimated from the received signal.

Accordingly, signal detection can be performed even without prior information about the user signals.

Alternatively, the signal parameter of each of the signals may be received in advance from a transmission-side wireless communication device.

By acquiring the signal parameter of each signal in advance, signal detecting operation becomes simpler.

Although the invention has been described based on the preferred embodiments, the invention is not limited to these specific examples. Many substitutions and modifications can be made by people with ordinary skill in the art, without departing from the scope of the invention, which is defined by the appended claims.

This patent application is based on and claims the benefit of the earlier filing dates of Japanese Patent Applications No. 2004-287234 filed Sep. 30, 2004, and No. 2005-255083 filed Sep. 2, 2005, the entire contents of which are hereby incorporated by reference.

What is claimed is:

1. A signal detector arranged in a receiver of a wireless communication device used in a wireless communication environment in which a plurality of wireless communication devices communicate with each other using different signal bandwidths and different carrier frequencies, the signal detector comprising:

a variable passband bandpass filter configured to suppress out-of-band signals in a received signal using a variable passband and output a band limited signal;

a signal parameter detection unit configured to detect a signal parameter of each of a plurality of signals contained in the received signal;

a detection order determination unit configured to determine a detection order for detecting said plurality of signals contained in the received signal based on the signal parameter;

a parameter control unit configured to control the passband of the variable passband bandpass filter based on the detection order and the signal parameter; and an equalization and decision unit configured to equalize and decide on the bandlimited signal output from the variable passband bandpass filter, said plurality of signals contained in the received signal being successively detected from the received signal according to the detection order by way of the variable passband bandpass filter and the equalization and decision unit;

a replica generator configured to generate a replica of the received signal using a decision result and a channel estimation value each produced by the equalization and decision unit, wherein the signal detector has multiple stages of signal detection in succession, each stage being defined by a combination of the variable passband bandpass filter, the equalization and decision unit, and the replica generator, and at each particular stage, the replica signal produced in the previous stage is subtracted from the received signal, and the bandlimiting and the equalization and decision making in the particular stage are performed using the residual signal.

2. The signal detector of claim 1, wherein the detection order determination unit includes:

a mutual interference estimation unit configured to estimate a mutual interference between said plurality of signals contained in the received signal; and a quality estimation and order determination unit configured to determine the detection order for detecting said plurality of signals from the received signal based on the estimated mutual interference and to determine a quality used as a reference when deciding on a signal at a given detection order, the quality being estimated by regarding mutual interference due to signals at higher detection orders than the given order as being equal to or less than a prescribed level in the determination of the detection order.

3. The signal detector of claim 2, wherein the mutual interference estimation unit includes:

a signal power level estimation unit configured to estimate a reception power level of each of said plurality of signals contained in the received signal;

a unit bandwidth based signal power level calculation unit configured to calculate a signal power level per unit bandwidth of each of the plurality of signals based on the signal parameter and the reception power level estimated by the signal power level estimation unit;

a signal overlay estimation unit configured to estimate an overlapped frequency bandwidth in which the plurality of signals overlap and interfere with each other based on the signal parameters; and an interference level calculation unit configured to calculate the mutual interference based on the signal power level per unit bandwidth and the overlapped frequency bandwidth.

4. The signal detector of claim 3, wherein:

the mutual interference estimation unit has a propagation path estimator configured to estimate a propagation path estimation value representing the state of a propagation path expanding along a time axis for each of the signals contained in the received signal; and the signal power level estimation unit estimates the power level using the propagation path estimation value of a principal wave of each of the signals.

5. The signal detector of claim 3, wherein the signal power level estimation unit estimates the power level of each of the signals by correlation detection using known symbol sequences, each of the symbol sequences corresponding to one of the signals contained in the received signal.

6. The signal detector of claim 3, wherein the unit bandwidth based power level calculation unit calculates the signal power level per unit bandwidth of each of the signals by averaging the signal power level estimation value estimated for a prescribed time duration using a signal bandwidth contained in the signal parameter.

7. The signal detector of claim 3, wherein the signal overlay estimation unit calculates an upper bound and a lower bound of a frequency band of each of the signals based on carrier frequency information and signal bandwidth information contained in the signal parameter, and compares the upper bound and the lower bound among all the signals contained in the received signal to estimate the overlapped frequency bandwidth.

8. The signal detector of claim 3, wherein the interference level calculation unit multiplies the signal power level per unit bandwidth of each of the signals by the overlapped frequency bandwidth to calculate the interference level between the signals contained in the received signal.

9. The signal detector of claim 1, wherein the detection order determination unit includes:
   a mutual interference estimation unit configured to estimate a mutual interference caused by the signals contained in the received signal overlapping and interfering with each other on a frequency axis, based on the received signal and the signal parameter of each of the signals;
   a noise estimation unit configured to estimate a noise level of each of the signals based on the received signal and the signal parameter; and
   a quality estimation and order determination unit configured to determine the order of detecting the signals from the received signal using the estimated mutual interference and the noise level and to estimate a quality used as a reference when deciding on a signal at a given detection order, the quality being estimated by regarding mutual interference due to signals at higher detection orders than the given order as being equal to or less than a prescribed level.

10. The signal detector of claim 9, wherein the noise estimation unit includes:
   a replica signal generation unit configured to generate a replica signal of the received signal from the received signal and the signal parameter;
   a subtractor configured to subtract the replica signal from the received signal and output a residual signal;
   a bandlimiting filter configured to bandlimit the residual signal to signal bandwidths of the signals contained in the received signal based on an estimated noise waveform contained in the received signal; and
   a noise level calculation unit configured to calculate and output a noise level removed by the bandlimiting filter for each of the signals contained in the received signal.

11. The signal detector of claim 1, wherein the detection order determination unit gives a higher detection order to a signal with a higher communication quality.

12. The signal detector of claim 1, wherein the signal parameter of each of the signals is estimated from the received signal.

13. The signal detector of claim 1, wherein the signal parameter of each of the signals is acquired in advance from a transmission-side wireless communication device.

14. A receiver of a wireless communication device used in a wireless communication environment in which multiple wireless communication devices communicate with each other using different transmission signal bandwidths, the receiver comprising a multi-user detector that includes:
   a plurality of bandlimiting filters with different passbands corresponding to a plurality of signals contained in an input signal, said plurality of signals of transmitted from the other wireless communication devices, said other wireless communication devices having transmission-end filters with different passbands;
   a channel estimator configured to estimate channel state information of each of said plurality of signals using signal information taking into account inter-symbol interference caused by the transmission-end filters and a receiving-end filter of the receiver;
   a minimum mean square error filter configured to calculate a filter coefficient using the estimated channel state information and the signal information and to equalize the associated bandlimited signal;
   a soft-in soft-out decoder configured to decide on user data items contained in the plurality signals using the signal information, and said soft-in soft out decoder configured to calculate a likelihood of respective symbols mapped to a signal space, said respective symbols being symbols in said plurality of signals;
   a replica generator configured to generate a symbol sequence replica based on the likelihood and to produce a received signal replica using the symbol sequence replica and the signal information, the symbol sequence replica being supplied to the minimum mean square error filter and used for the equalization of the bandlimited signal; and
   a subtractor configured to subtract the received signal replica from the input signal.

15. The receiver of claim 14, wherein the receiver has a multi-stage multi-user detection unit including two or more said multi-user detectors, each of the multi-user detectors performing signal detection and replica generation using a replica signal produced by the previous multi-user detector.

* * * * *